United States Patent
Kalveks et al.

(10) Patent No.: US 12,475,152 B1
(45) Date of Patent: Nov. 18, 2025

(54) INSIGHT-BASED RESEARCH SYNTHESIS AND PROCESSING PLATFORM

(71) Applicant: AlphaSights Ltd, London (GB)

(72) Inventors: Alexander Rudolph John Kalveks, London (GB); Srishti Nirula, London (GB); William Thomas Hayes, London (GB); Nicholas Edward Smith, New York, NY (US); Joshua Daniel Michael Dutton, London (GB)

(73) Assignee: AlphaSights Ltd, London (GB)

( * ) Notice: Subject to any disclaimer, the term of this patent is extended or adjusted under 35 U.S.C. 154(b) by 0 days.

(21) Appl. No.: 19/049,815

(22) Filed: Feb. 10, 2025

(51) Int. Cl.
*G06F 16/3329* (2025.01)
*G06F 16/22* (2019.01)
*G06F 16/338* (2019.01)

(52) U.S. Cl.
CPC ...... *G06F 16/3329* (2019.01); *G06F 16/2237* (2019.01); *G06F 16/338* (2019.01)

(58) Field of Classification Search
CPC . G06F 16/2237; G06F 16/3329; G06F 16/338
See application file for complete search history.

(56) References Cited

U.S. PATENT DOCUMENTS

| | | | |
|---|---|---|---|
| 11,868,736 B1 * | 1/2024 | Desai | G06T 15/00 |
| 12,353,407 B1 * | 7/2025 | Shachaf | G06F 16/243 |
| 2003/0069881 A1 * | 4/2003 | Huttunen | G06F 16/986 |
| | | | 707/999.005 |
| 2016/0364636 A1 * | 12/2016 | Kosinski | B42F 13/22 |
| 2019/0005328 A1 * | 1/2019 | Misra | G06F 40/216 |
| 2020/0089182 A1 * | 3/2020 | Rosca | G06F 16/1873 |
| 2023/0205794 A1 * | 6/2023 | Smaagard | G06F 16/322 |
| | | | 707/765 |
| 2024/0289545 A1 * | 8/2024 | Miller | G06F 40/20 |
| 2024/0311407 A1 * | 9/2024 | Barron | G06F 16/3344 |
| 2024/0362409 A1 * | 10/2024 | Kuan | G06F 40/30 |
| 2025/0165720 A1 * | 5/2025 | Haikin | G06Q 30/0201 |
| 2025/0246176 A1 * | 7/2025 | Nir | G06V 20/40 |

* cited by examiner

*Primary Examiner* — Eric Yen

(74) *Attorney, Agent, or Firm* — Sterne, Kessler, Goldstein & Fox P.L.L.C.

(57) ABSTRACT

Disclosed herein are system, method, and computer program product aspects for an insight-based research synthesis platform. An aspect operates by partitioning a piece of content into a plurality of content segments. An aspect also operates by contextualizing and/or enriching a content segment to form an insight. An aspect further operates by generating a vector embedding for the insight. An aspect further operates by determining that the vector embedding is relevant to a task associated with the piece of content. An aspect further operates by querying a language processor to perform the task using the insight. As such, the insight-based research synthesis platform may provide more efficient and higher quality results compared to conventional systems.

48 Claims, 10 Drawing Sheets

INSIGHT-BASED RESEARCH SYNTHESIS AND PROCESSING PLATFORM

BACKGROUND

Machine learning models have revolutionized various industries by providing various functionalities, such as classification and prediction. A subset of these models—large language models (LLMs)—have recently gained popularity for their ability to perform various natural language processing tasks. These tasks may include content generation, machine translation production, content summarization, and query fulfillment. However, despite their capabilities, conventional LLMs and content processing systems face a variety of technical challenges that limit their practical deployment in real-world systems. These challenges become particularly apparent when dealing with large-scale collections of multimodal content and dynamic information retrieval requirements.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
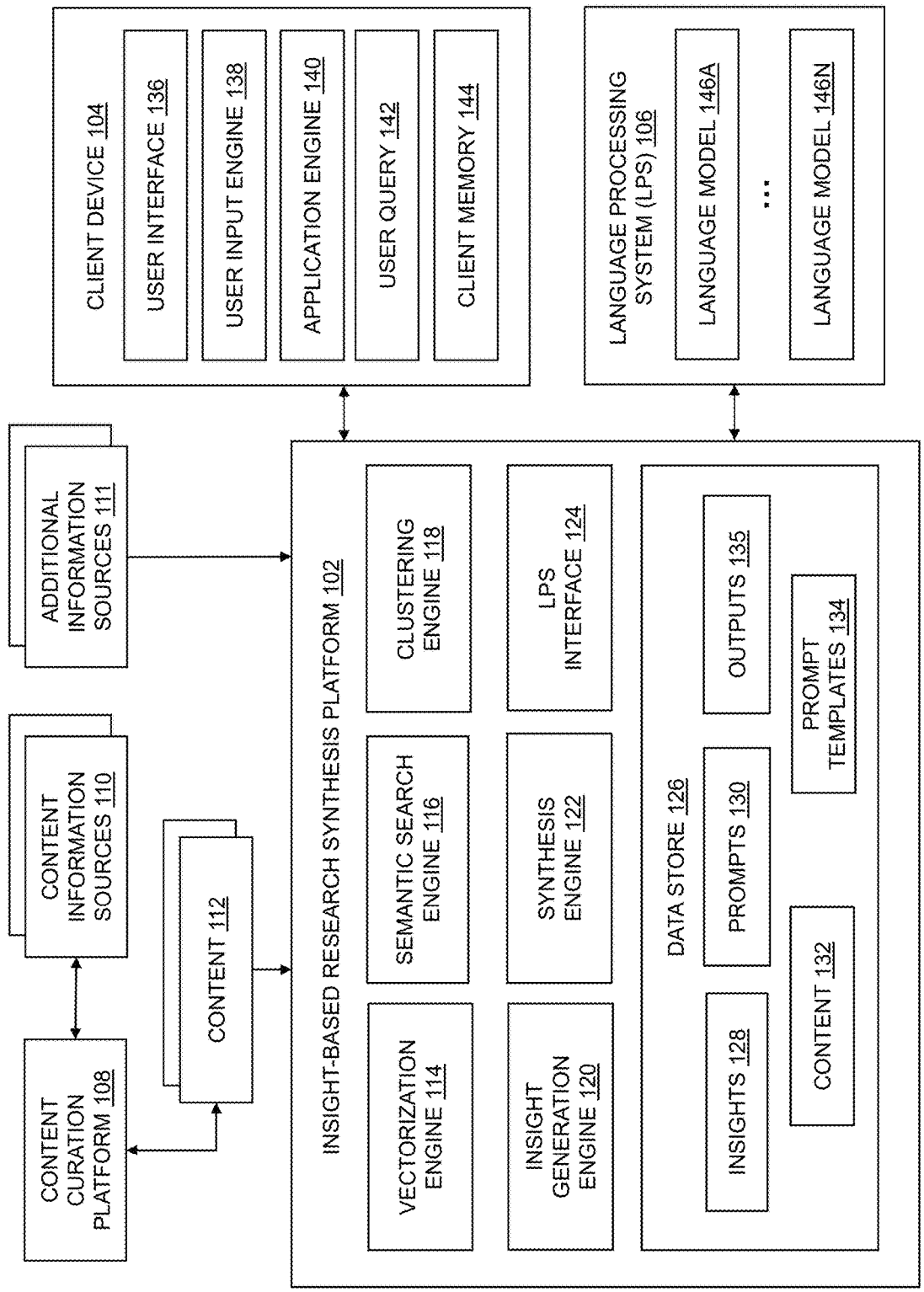
FIG. 1 illustrates an example block diagram of an insight-based research synthesis platform architecture, according to some aspects.

Disclosed herein are system, apparatus, device, method and/or computer program product aspects, and/or combinations and sub-combinations thereof for implementing an insight-based research synthesis platform, which may leverage artificial intelligence for insight generation and efficient processing of multimodal content. Examples of multimodal content may include, but are not limited to, text files, numerical files, pictures, videos, audio files, documents, and the like, as well as one or more portions, sections, or subsections thereof. As a convenience and not a limitation, the present disclosure may be described using the term "content." However, one of ordinary skill in the art will appreciate that the term "content" or "pieces of content" may refer to any type of multimodal content, such as those described above. As used herein, an "insight" may refer to a self-contained and semantically coherent representation of a content segment. The information contained within an insight may also be of higher density than the information contained within its corresponding content segment. The insight-based research synthesis platform may be used to process large quantities of content and retrieve relevant information, for example.

LLMs are one category of machine learning models that have emerged as useful tools for performing processing and analyzing content, offering capabilities such as summarization, information retrieval, and question answering. LLMs may provide a simple natural language interface and access to the large quantities of information on which they are trained, which may range from website content and software code to news articles and electronic books. However, despite these advantages, conventional LLMs and content processing systems suffer from a variety of technical problems that hinder their practical implementation in real-world settings, particularly in the context of handling document collections and dynamic information retrieval systems.

A primary technical challenge in current LLM content processing methods is the practice of repeatedly processing entire pieces of content for each query or analysis task. When new content is added to a data store or when existing content is updated, conventional systems often reprocess complete pieces of content through an LLM. This way, these systems can provide the most up-to-date information when performing various synthesis tasks such as retrieval or summarization. However, this repeated processing of entire pieces of content, including portions that are irrelevant for a specific query, results in substantial computational overhead and resource utilization during inference. "Inference" as used herein may refer to the process of running data points through a trained or partially trained machine learning model to generate outputs.

Furthermore, current LLM content processing methods suffer from technical limitations related to context management and information overload. LLMs typically have fixed context windows that limit the amount of input material they can process at once. When entire pieces of content are fed into these models, substantial portions of that limited context may be taken up by extraneous information. This leaves insufficient space for relevant content that could better inform a model's response to a specific query. By nature, LLMs are unable to filter out or skip over this extraneous information during inference. This is because current LLM architectures must process all the provided text or other input material, regardless of its relevance to a query. As a result, LLMs are unable to focus on the most relevant information to complete the task and address specific query requirements.

Additionally, LLMs face technical challenges when processing content in specific contexts. When processing technical content, conventional systems may fail to capture the precise context needed for accurate information retrieval. This limitation becomes particularly apparent in cases where content contains domain-specific terminology, complex relationships (that are not captured or fully explained within the content), or interdependent information that requires consideration of broader context, for example the context under which the content was created.

A further technical challenge faced by conventional LLMs relates to response reliability and accuracy. Even when reference pieces of content are provided during inference, foundation LLM models may generate hallucinations, which may include outputs that are inconsistent with or unsupported by the source content. In these cases, hallucinations may be caused by the statistical nature of LLM training and inference, where language models may blend pre-trained knowledge with content context provided, in highly unpredictable ways. Without any reliable mechanisms to check or ensure that the generated responses are grounded within the content provided, systems risk the dangers associated with system inaccuracy and unverifiability. These limitations may lead to severe consequences in real-world scenarios, where a single inaccuracy or defect can have domino effects leading to poorly informed decision making.

Some systems attempt to address these technical problems through retrieval-augmented generation (RAG) methods, which process documents into smaller chunks to send to an LLM. However, current RAG implementations also face their own set of technical challenges that hinder effective content processing. Conventional chunking methods are typically based on fixed-length divisions (e.g., splitting by every 5000 characters) or simple semantic boundary detection (e.g., splitting by paragraph). However, these strategies fail to preserve coherent units of information that may be necessary for accurate and efficient processing. For example, single chains of reasoning or context may become artificially separated across multiple content chunks. This may result in information gaps and fragmented contexts within and across content chunks.

Some current chunking strategies aim to address this problem by introducing overlaps between consecutive chunks, where subsequent chunks include a small number of characters (e.g., 100-200 characters) from the previous chunk. This strategy allows for some interconnectivity between content chunks and preserves some context that would have been lost. However, this technique does not adequately address the limitations described above, where needed context spans beyond a small number of overlapping characters. This strategy does not capture context required when synthesizing across several separate but related pieces of content, for example. This technique also introduces further technical problems, by requiring additional memory to store the overlapping characters for every single content chunk. In content management systems where there may be millions or billions of pieces of content, the excessive memory usage would be significant.

These technical problems are worsened by the limitations of existing search and retrieval mechanisms. Conventional searching systems often solely rely on keyword matching or semantic similarity measurements to determine the set of content chunks to send to the LLM. However, these systems may fail to identify all of the necessary content chunks for comprehensively addressing a given query. From solely relying on these mechanisms, critical context may be missing from the retrieved sets of content chunks, and the LLM would generate an incomplete and/or factually incorrect response as a result. These information gaps are further widened when systems start working with complex queries that require understanding relationships across multiple sections of content, or across different pieces of content.

Aspects of the disclosure herein solve these technological problems by implementing an insight-based research synthesis platform. An "insight" as used herein may refer to a self-contained and semantically coherent representation of a content segment. The information contained within an insight may be of higher density than the information contained within its associated content segment. The information contained within an insight may partially be encapsulated in a text passage, or a record in another modality, (hereafter "insight text"), generated from the associated content segment, and optionally other content. For example, an insight text may have all extraneous or unnecessary information removed from the corresponding content segment, or an insight text may have any required or helpful context from other content segments or content inserted. The information contained within an insight may additionally be enriched and partially encapsulated in structured metadata extracted from content, content segments, or additional information sources accessed by the insight-based research synthesis platform ("metadata"). Metadata may further increase the information density of the insight, aid in insight retrieval, and assist visualization of insight information in downstream outputs.

The insight-based research synthesis platform may be used to process large quantities of content and retrieve relevant information, for example. In some aspects, the insight-based research synthesis platform can first process content into insights and store the insights inside a central data store. The insight-based research synthesis platform may then perform various tasks relating to the content by using the insights rather than the pieces of content themselves. These tasks may include, but are not limited to, synthesis, summarization, information retrieval, information visualization, text classification, text translation, information analysis, information tabulation, graphing, quote selection, and comparisons. The insight-based research synthesis platform may include various input modes and model modalities including, but not limited to, multimodal machine learning models, large language models, data models, statistical models, audio models, visual models, and audiovisual models. The insight-based research synthesis platform may also support simplified human-computer interactions via a natural language interface including adaptable forms of input including, but not limited to, numerical data, text, audio, images, and more.

In some aspects, the insight-based research synthesis platform may provide functionality for performing tasks related to one or more pieces of content, for example, via artificial intelligence. The insight-based research synthesis platform may partition a piece of content into a plurality of content segments. A piece of content may be any of the example multimodal content discussed above, including, but not limited to, an entire document or one or more portions, sections, or subsections thereof. The insight-based research synthesis platform may then contextualize a content segment from the content segments to form an insight. In some aspects, contextualizing a content segment to form an insight may involve querying a language processing system using additional content segments different from the content segment for which an insight is being formed (e.g., to generate a context-rich, atomic piece of information containing a higher density of information than the original content segment). In some aspects, contextualizing the content segment may also involve including information from other additional information sources and data models (e.g., proprietary and/or third party models) in the insight. The insight-based research synthesis platform may then generate a vector embedding for the insight. The insight-based research synthesis platform may then determine that the vector embedding is relevant to a certain task. The insight-based research synthesis platform may then query, based on the determining, a language processing system having one or more language models, or another data-processing model, to perform the task using the insight alone, or in connection with other insights, associated pieces of content, or information.

In some aspects, the insight-based research synthesis platform may provide functionality for generating a stitched summary. A stitched summary may refer to an arrangement of various text data and/or additional information (e.g., numerical information, graphical elements, hyperlinks, etc.) that in concert provide a summary for one or more pieces of content. The insight-based research synthesis platform may first identify a first cluster including one or more insights associated with a piece of content. The insight-based research synthesis platform may then obtain a first cluster summary for the cluster by querying the natural language processing system and leveraging information contained within the insights and their associated content segments. The insight-based research synthesis platform may then identify a second cluster including one or more additional insights associated with the piece of content. The insight-based research synthesis platform may then obtain a second cluster summary for the piece of content from the natural language processing system and information contained within the insights and their associated content segments. The insight-based research synthesis platform may then generate a summary for the piece of content by stitching the first cluster summary and the second cluster summary together. In some aspects, a stitched summary may exist as its own data structure within computer memory, which may be associated with additional metadata to aid in visualization. A stitched summary and associated metadata may also be rendered as a visualization at a client interface, alongside underlying source content information as desired, in a seamless and coherent manner.

In some aspects, the insight-based research synthesis platform may provide functionality for generating a stitched summary for multiple pieces of content. The insight-based research synthesis platform may identify a first cluster including one or more insights associated with one or more of the multiple pieces of content. The insight-based research synthesis platform may then obtain a first cluster summary for the cluster by querying the natural language processing system. The insight-based research synthesis platform may then identify a second cluster including one or more additional insights associated with one or more of the multiple pieces of content. The insight-based research synthesis platform may then obtain a second cluster summary for the cluster from the natural language processing system. The insight-based research synthesis platform may then generate a summary for the multiple pieces of content by stitching the first cluster summary and the second cluster summary together.

In some aspects, the insight-based research synthesis platform may provide functionality for generating a sourced query result. The insight-based research synthesis platform may partition a piece of content into a plurality of content segments. The insight-based research synthesis platform may then contextualize a content segment from the content segments to form an insight. The insight-based research synthesis platform may also assign an identifier to the content segment that links the content segment with the insight. The insight-based research synthesis platform may identify the insight as a relevant insight for a query. The insight-based research synthesis platform may then identify one or more additional insights as relevant insights, and obtain a query result output for the query by querying the language processing system with the relevant insights and their associated content segments. The insight-based research synthesis platform may then augment the query result with source text from associated content segments and/or link(s) to the content segments.

These approaches provide direct technological improvements over previous systems via an implementation that indexes information in content into self-contained atomic insights that preserve semantic meaning and context. These approaches allow for more efficient and effective querying of language models by restricting model inputs to a curated and condensed set of relevant insights, rather than relying on the LLM to process and organize entire pieces of content or content sections. Furthermore, because these insights contain less extraneous information and/or additional helpful context, the output quality from querying the language models is increased.

The techniques described herein also improve the functioning of a computing system. Insights can provide for improved and faster querying and output generation by generative artificial intelligence systems. In previous implementations, an LLM or other language model would require extensive compute resources and time to tokenize and respond to content-processing queries using entire pieces of content or content sections. In particular, extensive compute resources and time would be dedicated for content sections that were not pertinent to a given query. Furthermore, inputs from these implementations would contain information gaps and fragmented context that led to incomplete LLM responses. RAG implementations using chunk overlapping techniques to address context gaps do not benefit from external information which may be used to enrich insights, and may require additional memory resources to store the overlapping chunks.

By contrast, the aspects described herein may preprocess those pieces of content or content sections into various insights to efficiently and accurately respond to those same queries. This saves the computational time and resources that would otherwise have been expended during inference to formulate responses to client queries using entire pieces of content or content sections. Additionally, this saves memory resources that would have been required to store the overlapping sections across all content chunks. This also saves the computational time and resources that would have been expended to re-perform any inference or additional processing to address any response inaccuracies or incompleteness caused by context gaps. Furthermore, while the conservation of computational and memory resources may be limited with respect to a single client device, the total conservation of computational and memory resources across an entire fleet of client devices may be significant.

These technical advantages may be appreciated, for example, in resource-constrained environments and large-scale document or content management systems. The overall computational efficiency of these systems may be improved as a result and the conserved resources may be reallocated for other tasks. Additionally, the context-rich and self-contained nature of insights may translate to fewer computational errors and higher performance accuracy.

Various aspects of this disclosure may be implemented using and/or may be a part of the example insight-based research synthesis platform shown in FIG. 1. It is noted, however, that these environments are provided solely for illustrative purposes, and are not limiting. Aspects of this disclosure may be implemented using and/or may be part of environments different from and/or in addition to the insight-based research synthesis platform, as will be appreciated by persons skilled in the relevant art(s) based on the teachings contained herein.

An example of the insight-based research synthesis platform shall now be described.

FIG. 1 illustrates an example block diagram of an insight-based research synthesis platform architecture 100, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Example insight-based research synthesis platform architecture 100 may include an insight-based research synthesis platform 102, a client device 104, a language processing system (LPS) 106, a content curation platform 108, content information sources 110, content 112, and additional information sources 111. In some aspects, example insight-based research synthesis platform architecture 100 may be implemented partially or entirely at client device 104. Alternatively or additionally, in some aspects, example architecture 100 may be implemented partially or entirely at third party servers or within the cloud. In such aspects, client device 104, insight-based research synthesis platform 102, language processing system 106, and content curation platform 108 may be communicatively coupled with each other via one or more networks, such as one or more wired or wireless local area networks ("LANs," including Wi-Fi, mesh networks, Bluetooth, near-field communication, etc.) or wide area networks ("WANs," including the Internet, cellular networks, etc.).

In some aspects, insight-based research synthesis platform 102 may include a vectorization engine 114, a semantic search engine 116, a clustering engine 118, an insight generation engine 120, a synthesis engine 122, an LPS interface 124, and a data store 126. In some aspects, insight-based research synthesis platform 102 may be implemented as one or more servers and/or one or more cloud servers. Insight-based research synthesis platform 102 may also be implemented as a variety of centralized or decentralized computing devices. For example, insight-based research synthesis platform 102 may operate on a mobile device, a laptop computer, a desktop computer, grid-computing resources, a virtualized computing resource, cloud computing resources, peer-to-peer distributed computing devices, a server farm, or a combination thereof. Insight-based research synthesis platform 102 may be centralized in a single device, distributed across multiple devices within a cloud network, distributed across different geographic locations, or embedded within a network. In some aspects, insight-based research synthesis platform 102 may receive pieces of content 112 curated by content curation platform 108. In some aspects, content curation platform 108 may interface with content information sources 110 to obtain content 112. For example, content information sources 110 may include subject matter experts that contribute their knowledge to content 112, and proprietary data models including but not limited to knowledge on companies, markets, customers, competitors, and more. As a few non-limiting examples, content 112 may include call or meeting transcripts, such as transcripts of discussions with subject matter experts and/or other content information sources 110. In some aspects, insight-based research synthesis platform 102 may query information from enriching additional information sources 111 to increase the information associated with insights 128 or content 132.

In some aspects, data store 126 may store various data used by insight-based research synthesis platform 102, including insights 128, content 132, prompt templates 134, outputs 135, and metadata and enriching information associated with these entities. For example, data store 126 may store content 112 received from content curation platform 108 as content 132. Data store 126 may be stored, for example, in a volatile memory (e.g., random access memory (RAM)), a non-volatile storage device (e.g., a disk), or in a distributed and/or redundant manner across multiple memories and/or storage devices. In some aspects, data store 126 is managed by and accessed via a corresponding database management system (DBMS), which is not shown in FIG. 1 for the sake of simplicity. Data store 126 and the corresponding DBMS may be implemented on one or more computer systems, such as computer system 1000 as described below in reference to FIG. 10. Data store 126 and the corresponding DBMS may also be implemented on one or more servers of an enterprise network and/or a cloud computing network.

As described above, insights 128 may be self-contained and semantically coherent representations of content segments. The "self-contained" property may indicate that insights 128 are each complete and independently interpretable without requiring any external references, dependencies, or context. As such, insights 128 may also each be interpreted as an atomic, standalone unit of information represented in a content segment. The "semantically coherent" property may indicate that insights 128 are each logically consistent and convey meaningful concepts or ideas. As a result, insights 128 may each contain information of a higher density than their respective content segment, represented both in their associated insight text and/or in other associated metadata. For example, extraneous or unnecessary information may be removed from a content segment during the formation of an insight text, so that the corresponding insight information is of higher specificity and concision. An insight text may also be enriched with required or helpful context from other content segments or other content. An insight text may also consolidate the information from the content segment. In addition to insight texts, insights 128 may also contain enriching structured metadata extracted from content, content segments, or additional information sources 111 accessed by the insight-based research synthesis platform. Metadata can be leveraged by insight-based research synthesis platform 102, which will be described in further detail below with respect to FIG. 2.

Language processing system (LPS) 106 may be a distributed computing system configured to execute one or more natural language machine learning models, such as language models 146A-146N (collectively, "language models 146"). In some aspects, language models 146 may be transformer and/or neural network based language models trained on large amounts of textual data (e.g., LLMs). Language models 146 may employ various model architectures including, but not limited to, encoder-decoder, causal decoder, and prefix decoder architectures. Various components of insight-based research synthesis platform 102 may leverage LPS interface 124 to communicate with LPS 106 and language models 146 to perform various tasks, such as responding to user queries across modalities (e.g., user query 142), partitioning content, generating insights, enriching insights, generating cluster topics and summaries, retrieving information, and more.

Generally, prompts 130 may refer to unimodal or multimodal natural language instructions or computer code that is fed into a language processing system (e.g., LPS 106).

Prompts 130 may include contexts, user instructions, system instructions, and/or other metadata for guiding LPS 106 towards generating a desired output. Prompts 130 may come in many different forms and have various different applications. For example, prompts 130 may define functionality for partitioning a piece of content, generating a cluster theme or summary for one or more pieces of content, retrieving information, and responding to user queries (e.g., user query 142).

Prompt templates 134 may define certain structures for prompts 130 to follow before prompts 130 are submitted to LPS 106. Prompt templates 134 may leverage predefined configurations or optimizations for obtaining more accurate and higher quality responses by LPS 106. For example, prompt templates 134 may provide additional context for a task and specific rules or guidelines to follow during inference. Prompt templates 134 may also define how user queries (e.g., user query 142) and/or insight texts are incorporated into prompts 130. For example, a prompt template may include various placeholders where different portions of user query 142 and/or insight texts may be inserted.

Insight generation engine 120 may generate insights 128 from partitioned content segments. Insight generation engine 120 may partition content 112 into corresponding content segments that may be used for generating insights 128. In some aspects, insight generation engine 120 may employ LPS interface 124 to obtain content segments for a piece of content. Insight generation engine 120 may aim to identify a set of content segments where each content segment captures a single idea or concept. To accomplish this, insight generation engine 120 may first leverage a prompt from prompt templates 134. Insight generation engine 120 may then employ LPS interface 124 to query LPS 106 using the prompt to obtain content segments for a piece of content. In some aspects, insight generation engine 120 may receive segment boundaries for the content from LPS 106. In such aspects, insight generation engine 120 may then determine the content segments using the segment boundaries. In some aspects, insight generation engine 120 may receive the content segments from LPS 106. In any case, the content segments may, in aggregate, constitute or "sum up to" the corresponding piece of content. In constructing a response, LPS 106 may employ various techniques including, but not limited to multi-head self-attention mechanisms, positional encoding, layer normalization, masked autoregressive decoding nucleus sampling, Softmax token distribution computation, and key-value cache optimization.

Alternatively or additionally, insight generation engine 120 may employ a naïve chunking strategy to obtain content segments. For example, insight generation engine 120 may obtain one or more content segments from content 112 or content 132 by splitting by a predetermined amount of characters (e.g., splitting every 4000 characters). Insight generation engine 120 may also employ a stochastic naïve chunking strategy that splits content 112 or content 132 by a random number of characters.

In some aspects, insight generation engine 120 may generate insight texts for insights 128 corresponding to one or more content segments (e.g., content segments obtained by insight generation engine 120). In some aspects, insight generation engine 120 may formulate prompts 130 to generate insight texts for insights 128, through LPS interface 124. In some aspects, insight generation engine 120, for a content segment for which an insight text is being generated, may wrap that content segment along with additional context (e.g., from other content segments from the piece of content, from the entire piece of content, from related content, from additional information sources etc.) inside a prompt template (e.g., prompt templates 134). Insight generation engine 120 may then employ LPS interface 124 to query LPS 106 using the constructed prompt to generate an insight text for the content segment.

In some aspects, the query to LPS 106 may include instructions to exclude unnecessary information from the content segment when generating the insight text. Alternatively or additionally, the query to LPS 106 may also include instructions to insert information contained within additional context (e.g., from other content segments from the piece of content, from the entire piece of content, from related content, from additional information sources etc.) that would enrich the current idea or concept inside the content segment. In some aspects, the query to LPS 106 may also include context from additional information sources 111, including other data sources and data models (e.g., proprietary and/or third party models), to enrich the idea or concept inside the content segment when generating the insight text. As a result, the generated insight text may possess a higher density of information compared to its corresponding content segment. In some aspects, the query to LPS 106 may also specify a granularity or level of granularity for the generated insight text.

In some aspects, insight generation engine 120 may also generate or identify and associate metadata and/or additional structured data with insights 128, for example, to further contextualize insights 128 and aid in data retrieval and verifiability. In some aspects, insight generation engine 120 may enrich insights 128 with additional structured data extracted from content or content segments, for example various metrics and entities discussed within the content or content segment. In some aspects, insight generation engine 120 may identify entities contained within a content segment or insight, describe those entities with identifiers, then use the identifiers to associate information derived from other additional information sources 111 with the insight (e.g., metadata and/or additional structured data from proprietary and/or third party models).

In some aspects, insight generation engine 120 may generate a segment identifier for an insight that links the insight to its corresponding content segment. Insight generation engine 120 may also generate one or more hyperlinks, for example, to the content, the content segment, or related content (e.g., content related to identified entities), and associate these with the insight. The various metadata and/or additional structured data for insights 128 may be described in further detail with respect to FIG. 2.

Semantic search engine 116 may retrieve structured or unstructured data within insight-based research synthesis platform 102. In some aspects, semantic search engine 116 may employ various search and retrieval methods to obtain records from data store 126. For example, semantic search engine 116 may first analyze a query (e.g., user query 142) to determine a relevant insight from among insights 128 in data store 126. In some aspects, semantic search engine 116 may perform classification on user query 142 and/or extract search parameters from user query 142. For example, semantic search engine 116 may employ a different retrieval technique based on a specific classification result. In unstructured text retrieval contexts (e.g., insight texts), semantic search engine 116 may employ techniques including, but not limited to, Boolean search techniques via TF-IDF scoring, semantic search, keyword search, hybrid retrieval techniques, and cross-encoder re-ranking strategies. For structured search and retrieval contexts, semantic search engine 116 may employ various techniques including, but not limited to, field-specific matching, numerical range queries, faceted search, and fuzzy search. Ultimately, the techniques relied upon by semantic search engine 116 may depend on how records in data store 126 are formatted. With respect to insights 128 corresponding insight texts, and additional enriching information, a few possible implementations are contemplated and discussed hereafter in FIGS. 2-3; however, those implementations are not meant to be limiting.

Vectorization engine 114 may convert each of insights 128 into insight embeddings, which represent condensed, numerical forms that can help efficiently differentiate between various data records, such as insights 128. For example, vectorization engine 114 may leverage techniques including word2vec, GloVe, or transformer-based models to generate dense vector representations for words or phrases in insights 128. In doing so, vectorization engine 114 may capture semantic relationships and contextual information within insights 128 into a format that can be searched and processed by insight-based research synthesis platform 102. In some aspects, semantic search engine 116 may leverage these insight embeddings to identify relevant insights. For example, when tasked with identifying a relevant insight for user query 142, semantic search engine 116 may first generate an embedding of user query 142. Semantic search engine 116 may then perform similarity searches (e.g., k-nearest neighbors, approximate nearest neighbors, locality-sensitive hashing, etc.) between the insight embeddings and the embedding of user query 142 to identify the set of insights that are most similar to a question or task specified in user query 142. This may allow semantic search engine 116 to leverage the structural properties of the vector space to retrieve relevant insights, especially in cases when the relevant insights do not observe surface-level similarities with the question or task specified in user query 142 (e.g., having the same keywords).

Clustering engine 118 may perform clustering on various data within insight-based research synthesis platform 102. For example, clustering engine 118 may perform clustering on insight embeddings corresponding to a subset of insights 128, such as the insights for one or multiple pieces of content. Clustering engine 118 may employ various clustering strategies and techniques, such as, but not limited to, hierarchical clustering (e.g., agglomerative clustering, divisive clustering, etc.), density-based clustering (e.g., DBSCAN, OPTICS, etc.), partitioning clustering (e.g., k-means clustering, k-medoids clustering, etc.), or model-based clustering (e.g., Gaussian mixture models, Dirichlet process mixtures, etc.). By grouping similar insights together, clustering engine 118 can help identify patterns, relationships, and underlying structures in the data.

Synthesis engine 122 may perform various generation functionalities across insight-based research synthesis platform 102, to produce outputs 135. Alternatively or additionally, synthesis engine 122 may also assist insight-based research synthesis platform 102 in performing tasks associated with content. Outputs 135 may include any items produced by synthesis engine 122 and/or insight-based research synthesis platform 102. In some aspects, synthesis engine 122 may generate cluster summaries and/or cluster themes from clusters identified by clustering engine 118. Synthesis engine 122 may then generate a stitched summary from using these cluster summaries and/or cluster themes, as just one non-limiting example of outputs 135. As described above, clustering engine 118 may perform clustering on the set of insights corresponding to one piece of content. Clustering engine 118 may also perform clustering on the set of insights corresponding to multiple pieces of content. Synthesis engine 122 may then formulate prompts 130 to generate a cluster summary and/or cluster theme using the identified clusters. In some aspects, synthesis engine 122 may wrap the insight texts, associated content segments, or insight information associated with the identified clusters inside a prompt template (e.g., prompt templates 134). Synthesis engine 122 may then employ LPS interface 124 to query LPS 106 using the constructed prompt to generate cluster summaries and/or cluster themes for the identified clusters using the insight texts and/or associated content segments. Synthesis engine 122 may then stitch the cluster summaries and/or cluster themes together to obtain a stitched summary. In generating a stitched summary, synthesis engine 122 may also include relevant source text from one or multiple pieces of content, or hyperlinks to relevant content segments. In some aspects, a relevant source text may be an excerpt of a content segment that contains the information that was used in generating a cluster summary or section thereof. For example, a relevant source text may be a sentence from the content segment. In some aspects, outputs 135 generated by synthesis engine 122 may be recorded within data store 126. In some aspects, model outputs 135 may become inputs to further prompt chains or algorithms producing further outputs 135.

In some aspects, synthesis engine 122 may also generate a sourced query result, as another non-limiting example of outputs 135. Insight-based research synthesis platform 102 may first receive user query 142 from client device 104 and forward user query 142 to synthesis engine 122. Synthesis engine 122 may then leverage semantic search engine 116 to identify one or more relevant insights for user query 142 using the techniques described above. Synthesis engine 122 may then formulate prompts 130 to obtain an initial query result for user query 142. In some aspects, synthesis engine 122 may wrap the one or more identified relevant insights and/or associated content segments inside a prompt template (e.g., prompt templates 134). Synthesis engine 122 may then employ LPS interface 124 to query LPS 106 using the constructed prompt to obtain the initial query result. In some aspects, synthesis engine 122 may then generate a sourced query result using the initial query result obtained from LPS 106 and relevant source text from pieces of content or hyperlinks to relevant content segments. In some aspects, the sourced query result may also include a hyperlink to an entire relevant piece of content. In some aspects, outputs 135 generated by synthesis engine 122 may be recorded within data store 126. In some aspects, model outputs 135 may become inputs to further prompt chains or algorithms producing further outputs 135.

Client device 104 may be one or more of a desktop computer, a laptop computer, a tablet, a mobile phone, a smart appliance such as a smart television, and/or a wearable apparatus of the user that includes a computing device (e.g., a smartwatch, smart glasses, or a virtual or augmented reality computing device). Additional and/or alternative client devices are within the scope of this disclosure. Client device 104 may include a corresponding user interface 136, user input engine 138, application engine 140, user query 142, and client memory 144.

User interface 136 may be configured to render content including unimodal responses, multimodal responses, or other content for audible or visual presentation to a user of client device 104 using one or more user interface output devices. For example, client device 104 may include a display or projector that enables content to be provided for visual presentation to a user via client device 104. Alternatively or additionally, client device 104 may include one or more speakers that enable content to be provided for audible presentation to a user via client device 104.

User input engine 138 may detect user input provided by a user of client device 104 using one or more user interface input devices. For example, client device 104 may include one or more microphones that capture audio data, such as audio data corresponding to spoken utterances of the user or other sounds in an environment surrounding client device 104. Alternatively or additionally, client device 104 may include one or more vision components (e.g., a camera) that may capture vision data corresponding to images and/or movements (e.g., gestures) detected in a field of view of one or more of the vision components. Alternatively or additionally, client device 104 may include one or more touch sensitive components including, but not limited to, a keyboard and mouse, a stylus, a touch screen, a touch panel, and physical buttons configured to capture signals corresponding to touch input directed towards client device 104.

Application engine 140 may execute one or more software applications on client device 104. In some aspects, application engine 140 may submit a natural language query (e.g., user query 142) to insight-based research synthesis platform 102. Application engine 140 may then receive unimodal, multimodal, or other responses from insight-based research synthesis platform 102 in response to a natural language query, which may then be rendered onto user interface 136 (e.g., audibly and/or visually). Application engine 140 may execute one or more software applications that are separate from an operating system of the client device 104 or may alternatively be implemented directly by the operating system of client device 104. For example, the application engine 140 may execute one or more software applications via a web browser or assistant.

User query 142 may represent an input provided by a user of client device 104 and may be detected via user input engine 138. For example, user query 142 may include a question or task by a user regarding content 132 or a subset of content 132, such as asking for specific information or summarizing information. In some aspects, user query 142 may be specify one or more search parameters to obtain relevant content from content 132 (e.g., one or more keywords, boolean operators, content type, etc.). In some aspects, user query 142 may be a typed query that is typed via a physical or virtual keyboard, a suggested query that is selected via a touch screen or a mouse of client device 104, a spoken voice query that is detected via a microphone of client device 104 (or directed to an voice assistant running at client device 104), or an image or video query that is based on vision data captured by a vision component of client device 104.

In some aspects, user query 142 may be converted to a natural language based input or a multimodal input to be submitted to insight-based research synthesis platform 102. Alternatively or in addition, user query 142 may be sourced via image processing techniques utilizing, for example, object detection models, captioning models, or the like. In some aspects, user query 142 may be a prompt for content that is formulated based on user input provided by a user of client device 104 and detected via user input engine 138. For example, the prompt can be a typed prompt that is typed via a physical or virtual keyboard, a suggested prompt that is selected via a touch screen or a mouse of client device 104, a spoken prompt that is detected via a microphone of client device 104, or an image or video prompt based on data captured by a vision component of client device 104.

Client memory 144 may include a data store containing data about a user of client device 104 or about client device 104 itself. In some aspects, client memory 144 may store one or more queries (e.g., user query 142) made by a user of client device 104. Client memory 144 may also store a context of client device 104. As just one example, client memory 144 may store conversation data by a user with insight-based research synthesis platform 102. Client memory 144 may also store user interaction data about current or recent interactions between a user or multiple users and client device 104. In some aspects, client memory 144 may also store location data about current or recent locations of client device 104 or a geographical region associated with a user of client device 104. Client memory 144 may also store user attribute data, user preference data, a user profile, or various configurations relating to client device 104 or a user of client device 104. In some aspects, the data stored in client memory 144 may be communicated partially or entirely to insight-based research synthesis platform 102 (e.g., to produce higher quality outputs).

Figure 2:
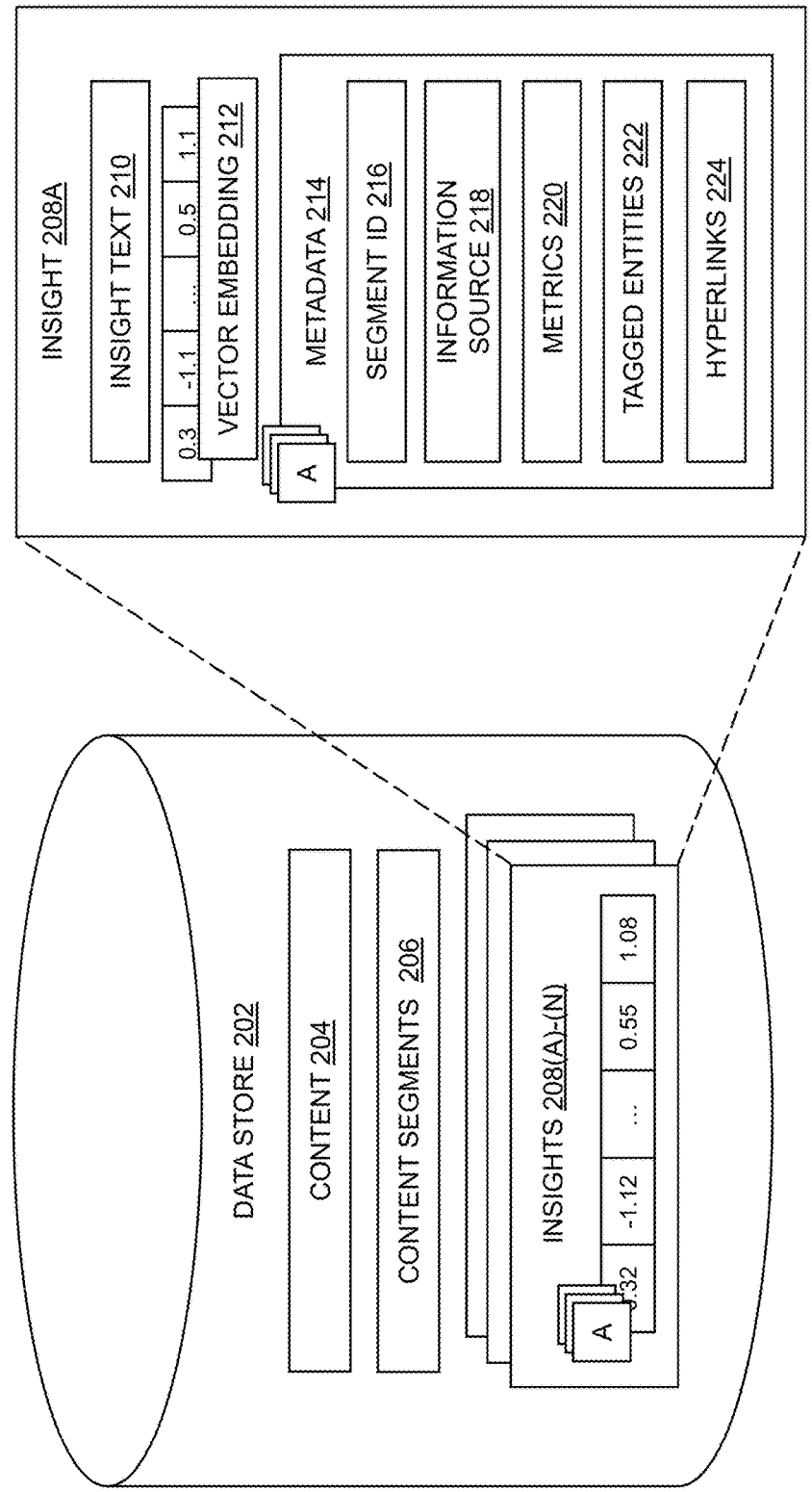
FIG. 2 illustrates an example block diagram of an insight data structure, according to some aspects.

FIG. 2 illustrates an example block diagram of a system 200 for an insight data structure, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 2, as will be understood by a person of ordinary skill in the art. System 200 shall be described with reference to FIG. 1. However, system 200 is not limited to those example aspects.

As shown in FIG. 2, system 200 may include a data store 202. Data store 202 may include content 204, content segments 206, and insights 208(A)-(N). In some aspects, data store 202 may be an example of data store 126 (of FIG. 1). Content 204 may be an example of content 132. Insights 208(A)-(N) may be an example of insights 128. Insights 208(A)-(N) may include insight 208A, which may include insight text 210, vector embedding 212, and metadata 214. Metadata 214 may include segment ID 216, information source 218, metrics 220, tagged entities 222, and hyperlinks 224. In some aspects, information source 218 may be an example of content information sources 110.

Similar to the discussion above, data store 202 may store various data used by an insight-based research synthesis platform (e.g., insight-based research synthesis platform 102). Data store 202 may store various pieces of content received from a content curation platform (e.g., content curation platform 108) as content 204. In some embodiments, data store 202 may also store content segments 206 generated from content 204 via partition (e.g., from insight generation engine 120). Content segments 206 may, in aggregate, constitute or "sum up to" the corresponding piece of content. In some aspects, content segments 206 may be document chunks similar to those used in RAG approaches. Content segments 206 may include less overlapping characters between chunks as compared with conventional chunking strategies (e.g., little or no overlap). In some embodiments, content segments 206 may be used to display source texts in a stitched summary or a query response, processes that will be described in further detail below with respect to FIGS. 5-8.

Also similar to the discussion above, insights 208(A)-(N) may be self-contained and semantically coherent representations of content segments. In some aspects, an insight 208A may contain an insight text 210 that semantically represents a corresponding content segment. An insight text 210 for an insight 208A may be represented in text form. Alternatively or additionally, an insight text 210 may include additional modalities other than text. For example, information in an insight text 210 may also be represented as an image, video, or audio file, which may be used for querying one or more multimodal models. Insight text 210 may include additional helpful context for interpreting the information within its corresponding content segment. For example, this additional helpful context may be information that was originally missing from the corresponding content segment. In some cases, this missing context could be detrimental to information retrieval and content management systems. In some embodiments, insight text 210 may also consolidate or summarize the salient points set forth in its corresponding content segment. In this process, insight text 210 may exclude unimportant or filler text from the corresponding content segment. Insight text 210 may also present the information in a more compact and concise manner. As a result of the above process, insight text 210 may contain a higher density of information than its corresponding content segment.

In addition to insight text 210, insight 208A may contain or be associated with additional structured data that can be leveraged by an insight-based research synthesis platform (e.g., insight-based research synthesis platform 102). In some aspects, this additional structured data may be generated or assigned by an insight generation engine (e.g., insight generation engine 120). In some aspects, insight 208A may include a vector embedding (e.g., vector embedding 212) that numerically represents a corresponding insight text 210. For example, vector embedding 212 may be a vector representation of insight text 210 obtained via a vectorization engine (e.g., vectorization engine 114). In some aspects, embedding 212 may be a sparse or dense vector representation of floating point values. Looking to FIG. 2, an example of vector embedding 212 may be (0.32, −1.12, . . . , 0.55, 1.08). Each column of vector embedding 212 may represent a value of a feature for the vector embedding model employed by insight-based research synthesis platform 102. For example, each feature may be a normalized token count or a feature in a multi-dimensional latent space for content 204. By having a specific combination of feature values, vector embedding 212 may numerically represent the information contained within insight text 210 and its corresponding content segment. This also allows insight-based research platform 102 to quickly compare vector embedding 212 with other vector embeddings (e.g., ones corresponding to insights 208(B)-(N)) using similarity comparison techniques (e.g., Euclidean distance, Manhattan distance, Minkowski distance, Chebyshev distance, cosine similarity, approximate nearest neighbors, contextual distance, etc.).

Metadata 214 may store additional structured data that can be leveraged by insight-based research synthesis platform 102. Metadata 214 may include a segment ID 216 that links insight 208A with its corresponding content segment. In some aspects, segment ID 216 may also serve as the main identifier for linking insight 208A with all associated data (e.g., insight text 210, vector embedding 212, information source 218, metrics 220, tagged entities 222, hyperlinks 224, the corresponding content segment(s), the corresponding piece of content etc.). Looking to FIG. 2, an example of segment ID 216 may be "A." However, these examples are not meant to be limiting, and additional representations for serving a similar purpose of differentiating insights 208(A)-(N) are contemplated, as would be appreciated by one skilled in the art. Segment ID 216 may be generated, for example, by an insight generation engine (e.g., insight generation engine 120). Segment ID 216 may then be used to track when insight 208A is determined as a relevant insight for a content related task or sent to a language processing model (e.g., LPS 106). In such cases, insight-based research synthesis platform 102 may leverage segment ID 216 to obtain the content segment corresponding to insight 208A (e.g., via a query to data store 202) for displaying the content segment or an excerpt thereof within a stitched summary or query response.

Similar to the discussion above, an information source may represent any source of information from which content 204 may be obtained. In some aspects, information source 218 may represent the source of information from which the content corresponding to insight 208A was obtained. For example, information source 218 may be one or more subject matter experts that contributed their knowledge to the content corresponding to insight 208A. Alternatively or additionally, information source 218 may specifically represent a source of information that contributed specifically to the content segment corresponding to insight 208A. This may be useful in cases when, for example, more than one source of information contributes to a piece of content. In such cases, an insight-based research synthesis platform (e.g., insight-based research synthesis platform 102) may only need to store the information source(s) that contributed to corresponding content segments, rather than blindly assigning all contributing information sources for the content to every single content segment. As one technical improvement over conventional systems, this granular approach may conserve any wasted memory resources utilized for redundant or unnecessary information source assignments across content segments. As a few non-limiting examples, the information within content 204 may include information about specific companies, markets, customers, competitors, any relationships thereof, metrics and more.

In some aspects, metrics 220 and tagged entities 222 may represent specific structured data points obtained from insight text 210 (or a corresponding content segment). In some aspects, metrics 220 and tagged entities 222 may be related to one another. For example, metrics 220 may be a numerical metric value for an entity from among tagged entities 222. As a few non-limiting examples, tagged entities 222 may include various companies, markets, industries, etc., and metrics 220 may include numerical performance indicators and business metrics, trends, and other data points. In such examples, one or more of metrics 220 may be related to one or more of tagged entities 222. Insight-based research synthesis platform 102 may then leverage metrics 220 and/or tagged entities 222 for more efficient search and querying, in addition to the techniques disclosed herein.

In some aspects, metrics 220 and/or tagged entities 222 may be obtained via an insights generation engine of an insight-based research synthesis platform 102 (e.g., insight generation engine 120). For example, insight generation engine 120 may first construct a prompt for extracting one or more metrics and entities from an insight text (e.g., insight text 210) or content segment. Insight generation engine 120 may then employ LPS interface 124 to query LPS 106 using the constructed prompt to obtain the one or more metrics and entities. Insight generation engine 120 may then assign the obtained metrics and entities as metadata to insight 208A (e.g., metrics 220 and tagged entities 222). In some aspects, insight generation engine 120 may consult an entity data model to determine whether an extracted entity obtained from LPS 106 is a taggable entity within insight-based research synthesis platform 102. The data model may define all taggable entities within insight-based research synthesis platform 102 and the relationships among and between them. In some aspects, insight generation engine 120 may repeat this querying process one or more times to ensure a threshold amount of metrics 220 and tagged entities 222 are properly extracted and assigned. Alternatively or additionally, metrics 220 or tagged entities 222 may be obtained by a separate extraction engine (not shown in FIG. 1). This extraction engine may employ various named entity recognition and metric identification techniques to obtain and assign metrics 220 or tagged entities 222 to insight 208A within metadata 214.

Hyperlinks 224 may include various links associated with insight 208A. In some embodiments, hyperlinks 224 may be used for directing a client interface (e.g., user interface 136) to a corresponding content segment (e.g., the content segment associated with segment ID 216) or the content from which insight 208A was obtained. Alternatively or additionally, hyperlinks 224 may include links to one or more specific excerpts or sections of the corresponding content segment. In some aspects, hyperlinks 224 may be generated by insight generation engine 120. Hyperlinks 224 may then be used to augment stitched summaries or query responses. For example, one or more of hyperlinks 224 may be embedded within a source text or a cluster summary output of a stitched summary or query response. One or more of hyperlinks 224 may also be directly included within a stitched summary or query response. Once added into user interface, a client may be directed to the corresponding content segment, content segment excerpt, or content by interacting with hyperlinks 224.

Figure 3:
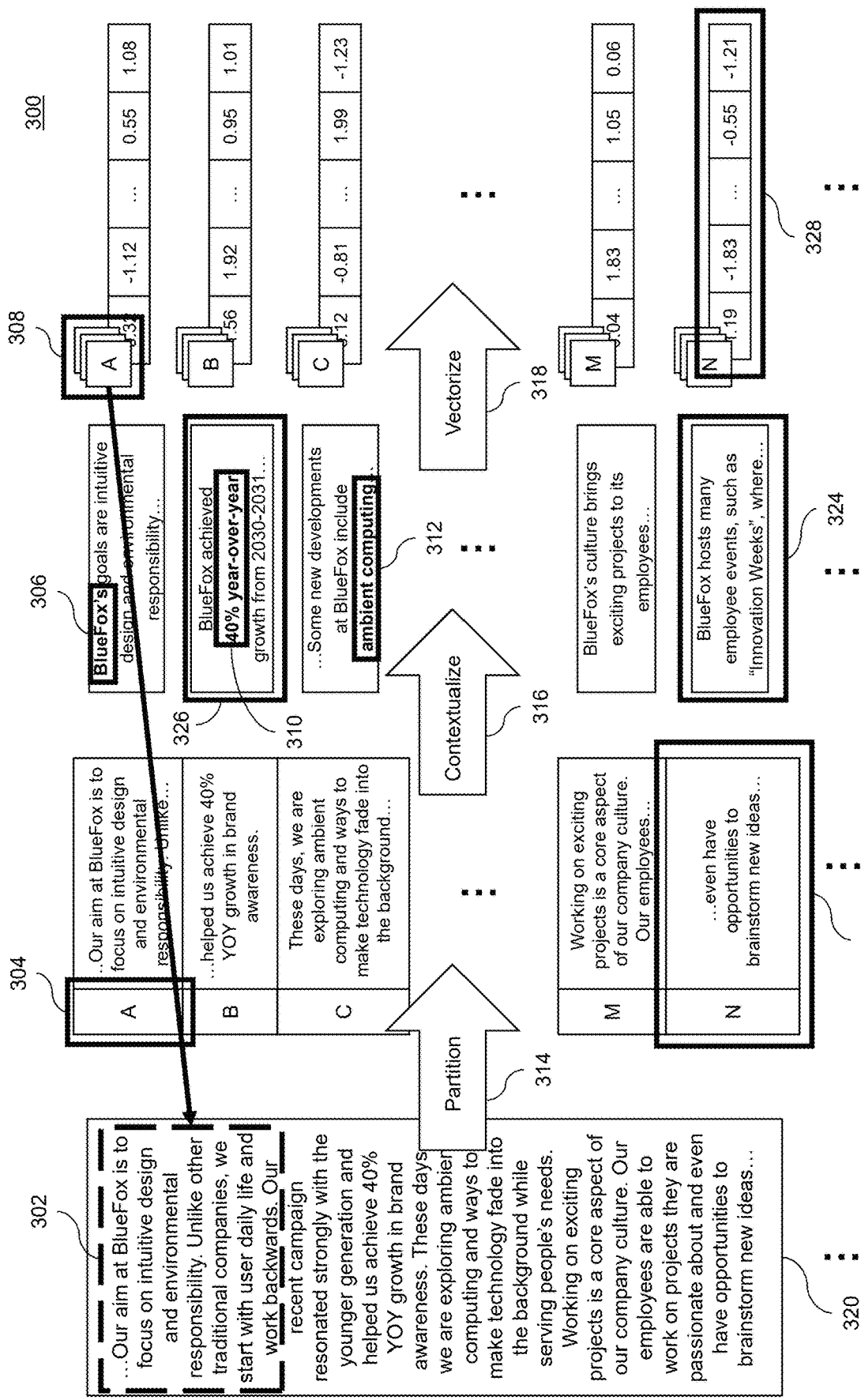
FIG. 3 illustrates an example block diagram for extracting insights, according to some aspects.

FIG. 3 illustrates an example block diagram of an environment 300 for extracting insights, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art. Environment 300 shall be described with reference to FIGS. 1-2. However, environment 300 is not limited to those example aspects.

In some aspects, environment 300 may first receive a piece of content 320 (or content section) from which to extract insights. Content 320 may discuss various topics or ideas within a company. For example, as shown in FIG. 3, content 320 may be a text document that reads: " . . . Our aim at BlueFox is to focus on intuitive design and environmental responsibility. Unlike other traditional companies, we start with user daily life and work backwards. Our recent campaign resonated strongly with the younger generation and helped us achieve 40% year-over-year growth in brand awareness. These days, we are exploring ambient computing and ways to make technology fade into the background while serving people's needs. Working on exciting projects is a core aspect of our company culture. Our employees are able to work on projects they are passionate about and even have opportunities to brainstorm new ideas . . . "

In 314, environment 300 may partition piece of content 320 into one or more content segments (e.g., content segment 322). For example, insight-based research synthesis platform 102 may leverage insight generation engine 120 to partition piece of content 320 to obtain a corresponding set of content segments. Insight generation engine 120 may first construct a prompt for LPS 106 to identify content segments that capture a single idea or concept. Insight generation engine 120 may then employ LPS interface 124 with the constructed prompt to obtain the content segments. For example, insight generation engine 120 may obtain content segments that read: " . . . Our aim at BlueFox is to focus on intuitive design and environmental responsibility. Unlike . . . ," " . . . helped us achieve 40% year-over-year growth in brand awareness," "These days, we are exploring ambient computing and ways to make technology fade into the background . . . ," "Working on exciting projects is a core aspect of our company culture. Our employees . . . ," and " . . . even have opportunities to brainstorm new ideas . . . "

In 314, environment 300 may also assign a segment identifier to each content segment (e.g., segment ID 304). For example, insight-based research synthesis platform 102 may leverage insight generation engine 120 to generate and assign a unique content segment identifier for each content segment obtained. As depicted in FIG. 3, insight generation engine 120 may assign a segment ID 304 of "A" to a content segment that reads: " . . . Our aim at BlueFox is to focus on intuitive design and environmental responsibility. Unlike . . . " Insight generation engine 120 may then assign a segment ID of "B" to a content segment that reads: " . . . helped us achieve 40% year-over-year growth in brand awareness." Insight generation engine 120 may then assign a segment ID of "C" to a content segment that reads: "These days, we are exploring ambient computing and ways to make technology fade into the background . . . " Insight generation engine 120 may then assign a segment ID of "M" to a content segment that reads: "Working on exciting projects is a core aspect of our company culture. Our employees . . . " Insight generation engine 120 may then assign a segment ID of "N" to a content segment that reads: " . . . even have opportunities to brainstorm new ideas . . . " Environment 300 may also generate one or more hyperlinks for each identifier, which may be used to direct a client interface to a corresponding content segment within content 320 or specific excerpts within the corresponding content segment.

In 316, environment 300 may contextualize each content segment into a corresponding insight. For example, insight-based research synthesis platform 102 may leverage insight generation engine 120 to contextualize the content segments obtained from content 320 to obtain a corresponding set of insights. Insight generation engine 120 may construct a prompt for LPS 106 to obtain an insight text from a content segment. In some aspects, insight generation engine 120 may wrap the content segment with additional context (e.g., other content segments from content 320, content 320 itself, other content related to content 320, context from other additional information sources or data models, etc.) inside a prompt template. Insight generation engine 120 may then employ LPS interface 124 to query LPS 106 and obtain a corresponding insight text (e.g., insight texts 324 and 326).

In some aspects (e.g., as in FIG. 3), each insight text may be one or more sentences in narrative form. As a few examples, insight generation engine 120 may obtain an insight text for segment ID "A" that reads: "BlueFox's goals are intuitive design and environmental responsibility . . . " Insight generation engine 120 may also obtain an insight text for segment ID "B" that reads: "BlueFox achieved 40% year-over-year growth from 2030-2031 . . . " Insight generation engine 120 may also obtain an insight text for segment ID "C" that reads: " . . . Some new developments at BlueFox include ambient computing . . . " Insight generation engine 120 may also obtain an insight text for segment ID "M" that reads: "BlueFox's culture brings exciting projects to its employees . . . " Insight generation engine 120 may also obtain an insight text for segment ID "N" that reads: "BlueFox hosts many employee events, such as 'Innovation Weeks', where . . . " However, the format of the insight text is not limited to just sentences. Alternatively or additionally, each insight text may take on any other forms, such as a question and answer pairing, a bullet point list, XML formatted text, etc., as would be appreciated by one of ordinary skill in the art. An example question and answer pairing may read: "What are BlueFox's goals? . . . BlueFox is focused on . . . ."

As a first example, insight generation engine 120 may obtain an insight text 324 that contains a higher density of information than its corresponding content segment, e.g., content segment 322. In this example, content segment 322 may discuss an idea from content 320 concerning employee "opportunities to brainstorm new ideas." However, it may be the case that the name for such opportunities, "Innovation Weeks," is not revealed until much later in content 320. It may also be the case that the content segment containing this extra context mostly discusses a separate idea (e.g., marketing efforts and results), and thus a semantic search for "employee events" would not successfully return that content segment. By contextualizing each content segment (e.g., by sending content 320 or a batch of additional content segments to LPS 106), the resultant insight text (e.g., insight text 324) may contain all the salient data points from content segment 322 along with additional context it previously did not contain (e.g., "Innovation Weeks"). Alternatively or additionally, converting to insight text 324 may remove any unnecessary text from content segment 322 and effectively represent the same (or additional) information more efficiently.

As another example, insight generation engine 120 may obtain an insight text 326 that also contains a higher density of information than its corresponding content segment (e.g., segment "B"). In this example, segment "B" may read: " . . . helped us achieve 50% YOY growth in brand awareness." Here, segment "B" may be discussing a business or financial performance metric of a company (e.g., year-over-year growth). To a computing system however, it may not be immediately apparent what metric the acronym "YOY" stands for, especially depending on how segment "B" was partitioned. Additionally, depending on the embedding model that is chosen, "50% YOY" may not be correctly represented semantically within a vector space. For example, the embedding model may simply embed "YOY" as the acronym itself, without any indication of the business or financial context of segment "B" or content 320. Even more detrimentally, a computing system may interpret or embed "YOY" in erroneous contexts, such as in biological contexts (e.g., "young-of-year") or other specific contexts. As such, insight text 326 may include an expanded version of "YOY" to clarify the term's context, thus contributing to a higher density of information as compared to segment "B."

In some aspects, environment 300 may recognize that simply expanding the "YOY" metric acronym still leaves out additional context that would be helpful for interpreting segment "B." For example, segment "B" may not include the year to which the YOY growth metric pertains. Similar to the first example, this information may lie within another content segment of piece of content 320. Alternatively or additionally, this information may lie within an entirely separate piece of content (e.g., another piece of content curated by content curation platform 108 alongside content 320, another piece of content from the same or related information source, content uploaded by a client device (e.g., client device 104), content scraped from the Internet, etc.). Then, LPS 106 may leverage any additional context provided by insight generation engine 120 to include the year(s) (e.g., "2030-2031") within insight text 326, which also contributes to a higher density of information as compared to the original segment "B."

In 316, environment 300 may also extract structured data from the insight texts for piece of content 320. For example, insight-based research synthesis platform 102 may leverage insight generation engine 120 to extract metrics and named entities from the obtained insight texts (e.g., insight texts 324 and 326). In such an example, insight generation engine 120 may first construct a prompt for LPS 106 to extract metrics and entities from insight text 324 and insight text 326. Insight generation engine 120 may then employ LPS interface 124 to query LPS 106 and obtain the metrics and entities. Alternatively or additionally, insight generation engine 120 may also consult an entity data model to determine whether an extracted entity obtained from LPS 106 is a taggable entity within insight-based research synthesis platform 102. The data model may define all taggable entities within insight-based research synthesis platform 102 and the relationships among and between them. Looking to FIG. 3, in 306, insight generation engine 120 may obtain the "BlueFox" named company entity from the insight text corresponding to segment "A" (insight text "A"). In 310, insight generation engine 120 may obtain the "40% YOY 2030" metric from insight text "B" (e.g., insight text 326). In 312, insight generation engine 120 may obtain the "ambient computing" named market entity from insight text "C." Upon extracting metric and entity data, environment 300 may assign the extracted data as metadata to the corresponding insights (e.g., metadata 308).

In 318, environment 300 may vectorize each insight text into corresponding insight embeddings. For example, insight-based research synthesis platform 102 may leverage vectorization engine 114 to convert the insight texts obtained from content 320 into a corresponding set of insight embeddings (e.g., using any of the techniques disclosed above). For example, vectorization engine 114 may obtain an insight embedding from insight text "A" (embedding "A") with a value of (0.32, −1.12, . . . , 0.55, 1.08). Vectorization engine 114 may also obtain an insight embedding from insight text "B" with a value of (1.56, 1.92, . . . , 0.95, 1.01). Vectorization engine 114 may also obtain an insight embedding from insight text "C" with a value of (0.12, −0.81, . . . , 1.99, −1.23). Vectorization engine 114 may also obtain an insight embedding from insight text "M" with a value of (0.04, 1.83, . . . , 1.05, 0.06). Vectorization engine 114 may also obtain an insight embedding from insight text "N" (e.g., insight embedding 328) with a value of (1.19, −1.83, . . . , −0.55, −1.21).

In some aspects, environment 300 may then obtain insights for content 320. For example, insight-based research synthesis platform 102 may use insight generation engine 120 to generate each insight, by grouping each insight text (e.g., insight text 324) with its corresponding insight embedding (e.g., insight embedding 328), and additional corresponding metadata (e.g., segment ID "N," metrics, entities, hyperlinks, etc.) to obtain insights "A"-"N." For example, in 308, metadata for the insight with segment ID "A" (insight "A") may be linked to and/or contain a hyperlink to the location of segment "A" within content 320 (e.g., location 302).

As with the examples described above, examples of specific pieces of content, content segments, segment IDs, insights, insight texts, insight embeddings, and additional insight metadata have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 4:
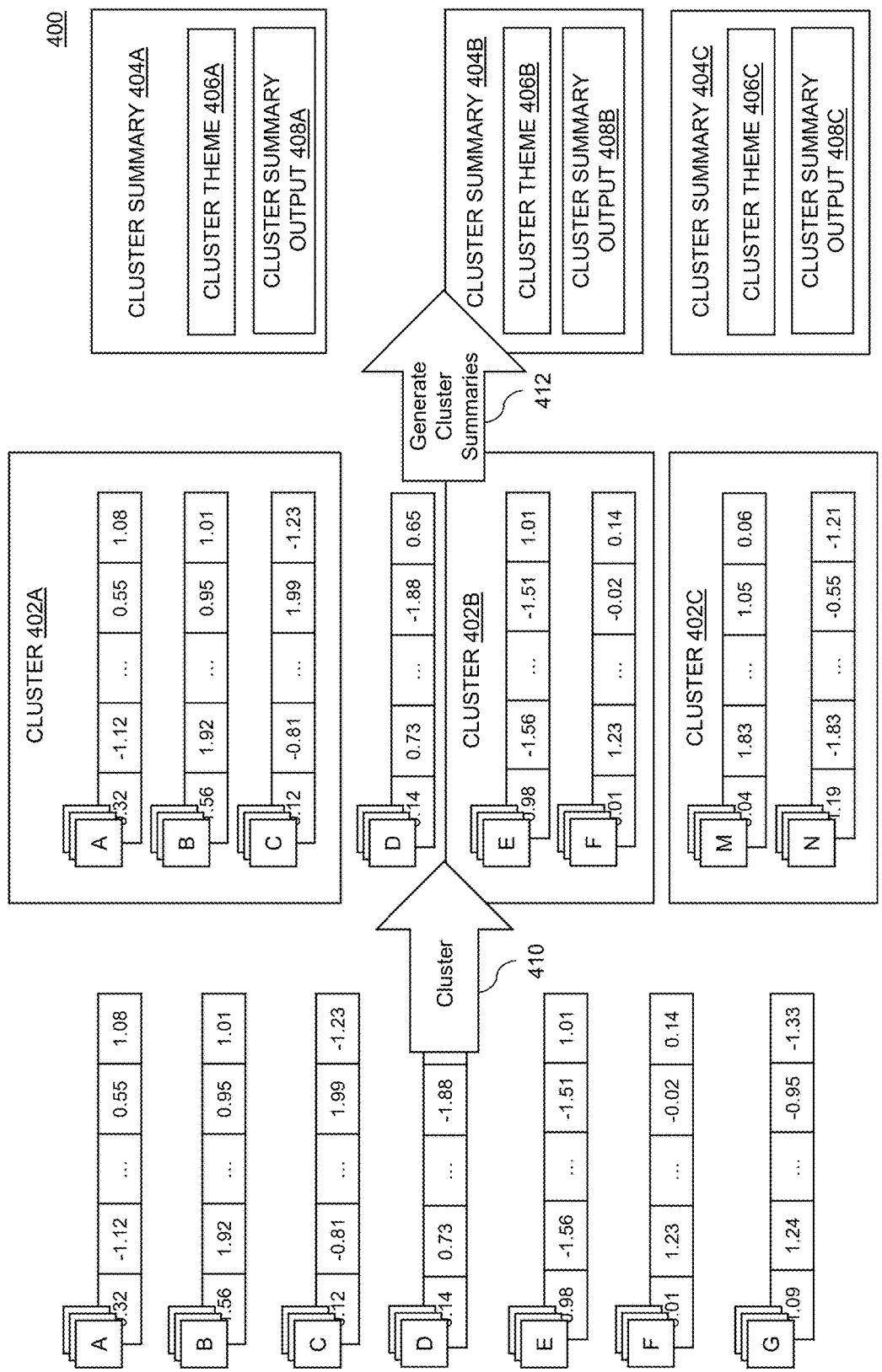
FIG. 4 illustrates an example block diagram for obtaining cluster summaries, according to some aspects.

FIG. 4 illustrates an example block diagram of an environment 400 for obtaining cluster summaries, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art. Environment 400 shall be described with reference to FIGS. 1-3. However, environment 400 is not limited to those example aspects.

In some aspects, environment 400 may receive a query to cluster a set of insights. For example, insight-based research synthesis platform 102 may receive a client or system query to cluster a set of insights corresponding to a piece of content (e.g., content from content 112, content 320, or content received from client device 104). Alternatively or additionally, insight-based research synthesis platform 102 may receive a client or system query to cluster a set of insights corresponding to multiple pieces of content (e.g., multiple pieces of content from content 112, content received from client device 104, or any combinations or sub-combinations thereof).

In 410, environment 400 may cluster the set of insights. For example, insight-based research synthesis platform 102 may leverage clustering engine 118 to perform clustering on insights "A"-"N" (e.g., using any of the various techniques disclosed above). Insights "A"-"N" may be examples of insights 128 (of FIG. 1) and insights 208(A)-(N) (of FIG. 2). Clustering engine 118 may obtain clusters 402A, 402B, and 402C. Cluster 402A may include insight "A," insight "B," and insight "C." This may be because insights "A," "B," and "C" are the most similar to each other as compared to the other insights and thus form a cluster. For example, this may include performing comparisons between insight embeddings "A," "B," and "C" and the other insight embeddings to obtain the cluster result. Alternatively or additionally, this may include performing comparisons between the metadata associated with insights "A," "B," and "C."

Cluster 402B may include insight "E" and insight "F." Similarly, insights "E" and "F" may be more similar to each other as compared to the other insights. Additionally, insights "E" and "F" may also be distinct from other clusters (e.g., clusters 402A and 402C) and thus form their own cluster (e.g., cluster 402B). Cluster 402C may include insight "M" and insight "N." Similarly, insights "M" and "N" may be more similar to each other as compared to the other insights and are likewise distinct from other clusters (e.g., clusters 402A and 402B). In some aspects, clustering engine 118 may determine that the remaining insights (e.g., insight "D" and insights "G"-"L") do not meet predetermined similarity thresholds to form a cluster, and thus may not be used in generating a corresponding summary. Alternatively or additionally, clustering engine 118 may determine that some or all of the remaining insights may each qualify as their own cluster, after which cluster summaries may be generated. For example, this may involve determining a relevance metric and/or evaluating embedding similarity distances to the existing clusters (e.g., clusters 404).

In 412, environment 400 may generate cluster summaries for each identified cluster. For example, insight-based research synthesis platform 102 may leverage synthesis engine 122 to generate cluster summaries 404A, 404B, and 404C (collectively, cluster summaries 404). In some aspects, cluster summaries 404 may each include a corresponding cluster theme (e.g., cluster themes 406A, 406B, and 406C (collectively, cluster themes 406)) and a corresponding cluster summary output (e.g., cluster summary outputs 408A, 408B, and 408C (collectively, cluster summary outputs 408)). To obtain cluster summaries 404, synthesis engine 122 may formulate prompts (e.g., prompts 130) to query LPS 106. For example, synthesis engine 122 may wrap information contained within insights "A," "B," and "C" and/or their associated content segments into a first prompt. This may encompass either or both of the insight texts and the metadata associated with such insights. Synthesis engine 122 may then employ LPS interface 124 to query LPS 106 for cluster theme 406A and cluster summary output 408A. Tasks LPS 106 may execute to generate cluster summary 404A may include synthesis, summarization, information retrieval, information visualization, text classification, text translation, information analysis, information tabulation, graphing, quote selection, comparisons, etc. In some aspects, this may be performed with the same or separate queries to LPS 106. Synthesis engine 122 may then obtain cluster summary 404A as a result.

Similarly, synthesis engine 122 may wrap information contained within insights "E" and "F," into another prompt. Synthesis engine 122 may then employ LPS interface 124 to query LPS 106 for cluster theme 406B and cluster summary output 408B. Synthesis engine 122 may then obtain cluster summary 404B as a result. Synthesis engine 122 may also wrap information contained within insights "M" and "N," and/or their associated content segments, into another prompt. Synthesis engine 122 may then employ LPS interface 124 to query LPS 106 for cluster theme 406C and cluster summary output 408C. Synthesis engine 122 may then obtain cluster summary 404C as a result. In some aspects, environment 400 may continue generating cluster summaries for any remaining identified clusters following a similar process.

As with the examples described above, specific clustering examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 5:
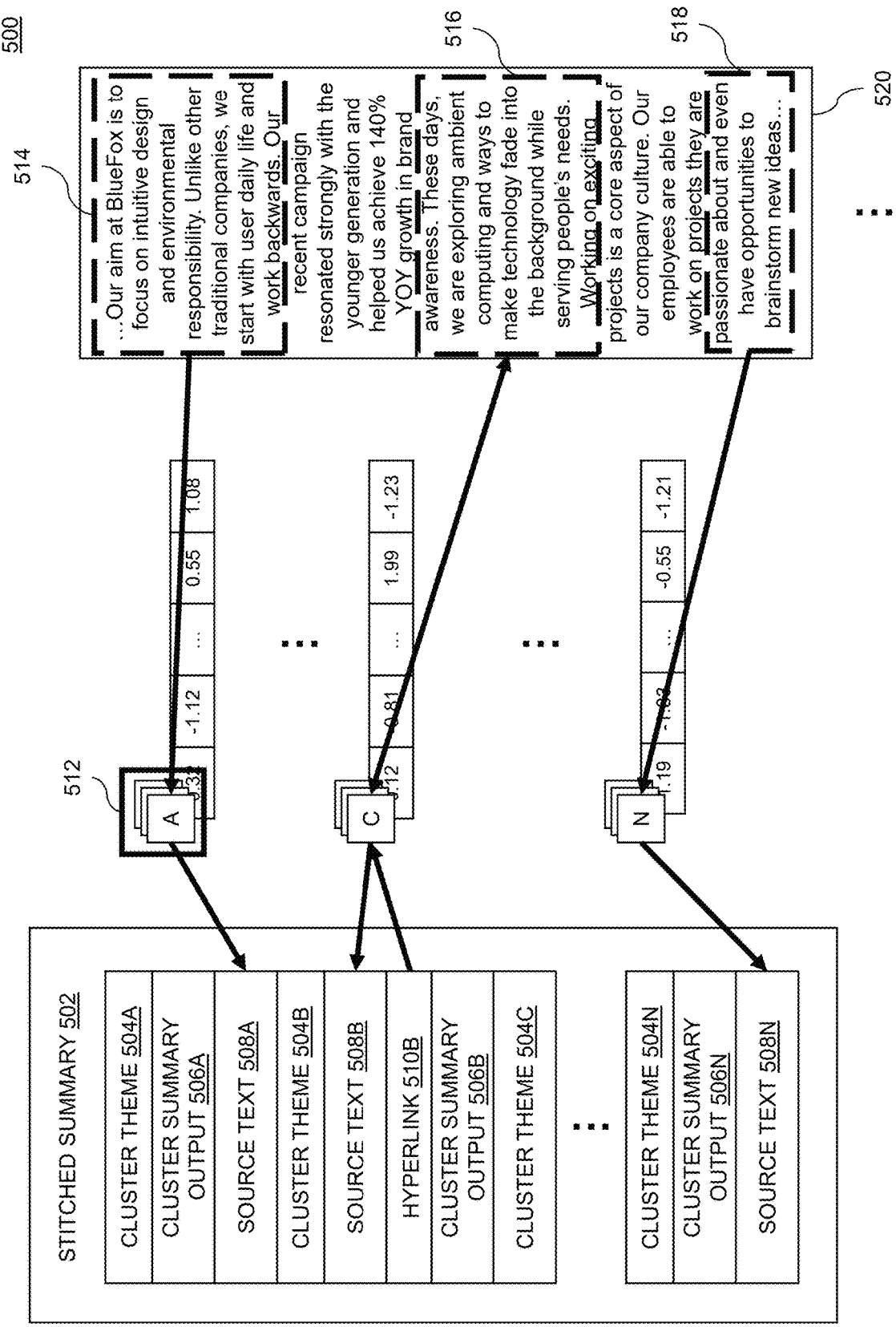
FIG. 5 illustrates an example block diagram of a stitched summary, according to some aspects.

FIG. 5 illustrates an example block diagram of an environment 500 for a stitched summary, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art. Environment 500 shall be described with reference to FIGS. 1-4. However, environment 500 is not limited to those example aspects.

In some aspects, environment 500 may include a stitched summary 502, a corresponding piece of content 520, and insights "A"-"N." Content 520 may be an example of content 112 or content 132 (of FIG. 1), content 204 (of FIG. 2), or content 320 (of FIG. 3). Insights "A"-"N" may be examples of insights 128 (of FIG. 1) and insights 208(A)-(N) (of FIG. 2). Stitched summary 502 may represent consolidated information for one piece of content (e.g., content 520). Stitched summary 502 may include cluster themes 504A, 504B, 504C, and 504N (collectively, cluster themes 504). Cluster themes 504 may be examples of cluster themes 406. Stitched summary 502 may also include cluster summary outputs 506A, 506B, and 506N (collectively, cluster summary outputs 506). Cluster summary outputs 506 may be examples of cluster summary outputs 408. Stitched summary 502 may also include source texts 508A, 508B, and 508N (collectively, source texts 508). Stitched summary may also include hyperlink 510B. Hyperlink 510B may be an example of hyperlinks 224.

In some aspects, stitched summary 502 may be generated by an insight-based research synthesis platform (e.g., insight-based research synthesis platform 102). For example, synthesis engine 122 may obtain stitched summary 502 by stitching together one or more cluster summaries and excerpts from content segments associated with insights contributing to those cluster summaries (e.g., source text 508A, source text 508B, or source text 508N), as depicted in FIG. 5. Stitched summary 502 may then be rendered on a client interface (e.g., user interface 136). Similar to the discussion above with respect to FIG. 4, cluster themes 504 and cluster summary outputs 506 may be obtained from a set of insights for a piece of content (e.g., content 520). Cluster themes 504 and cluster summary outputs 506 may also capture various themes within content 520 and more efficiently provide information relating to those themes in a consolidated and an easily digestible format.

Source texts 508 may include certain excerpts from content segments of content 520, associated with the insights contributing to stitched summary 502. In some aspects, source texts 508 may represent a source of information used in generating a cluster summary output or cluster theme (e.g., by LPS 106). For example, when querying LPS 106 to generate a stitched summary, synthesis engine 122 may include specific instructions inside a prompt to identify relevant source texts. Alternatively or additionally, synthesis engine 122 may leverage semantic search engine 116 to identify similar texts or matching keyword(s) with a generated cluster summary output or cluster theme.

Environment 500 may then include source texts 508 alongside cluster themes 504 or cluster summary outputs 506 within stitched summary 502. For example, synthesis engine 122 may include source text 508A alongside cluster summary output 506A. This may denote that source text 508A is relevant to cluster summary output 506A. Looking to FIG. 5, a content segment relating to insight "A" at location 514 within content 520 may be relevant to cluster summary output 506A. For example, synthesis engine 122 may determine that the following sentence is relevant to cluster summary output 506A: "Our aim at BlueFox is to focus on intuitive design and environmental responsibility." Synthesis engine 122 may then include this sentence within stitched summary 502 as source text 508A. In some aspects, this information may be stored within metadata 512, which synthesis engine 122 may leverage to obtain and display source text 508A.

As another example, synthesis engine 122 may include source text 508B alongside cluster theme 504B. This may denote that source text 508B is relevant to cluster theme 504B. For example, synthesis engine 122 may determine that the entire content segment for insight "C" (segment "C") at location 516 within content 520 is relevant to cluster theme 504B: "These days, we are exploring ambient computing and ways to make technology fade into the background while serving people's needs." Synthesis engine 122 may then include this content segment within stitched summary 502 as source text 508B. In some aspects, synthesis engine 122 may also include in stitched summary 502 hyperlinks to content segments (or excerpts of content segments). For example, synthesis engine 122 may include hyperlink 510B, which may direct a client on user interface 136 to the location of segment "C" within content 520 when interacted with (e.g., location 516). In some aspects, hyperlink 510B may be separate from source text 508B. Alternatively or additionally, hyperlink 510B may also be embedded within source text 508B as an augmentation to simple text.

Similarly, synthesis engine 122 may include source text 508N alongside cluster summary output 506N. This may denote that source text 508N is relevant to cluster summary output 506N. For example, synthesis engine 122 may determine that an excerpt from content segment "N" at location 518 within content 520 is relevant to cluster summary output 506N: " . . . opportunities to brainstorm new ideas." Synthesis engine 122 may then include this excerpt within stitched summary 502 as source text 508N.

In generating stitched summary 502, synthesis engine 122 may instruct LPS 106 to process and present cluster themes 504, cluster summary outputs 506, source texts 508, hyperlinks 510, and any other relevant inputs in such a manner to maximize usability, digestibility, information relevance, and information richness of the stitched summary 502. This may include but is not limited to ordering, ranking, consolidation, visualization, tabulation, generating graphics, etc.

Figure 6:
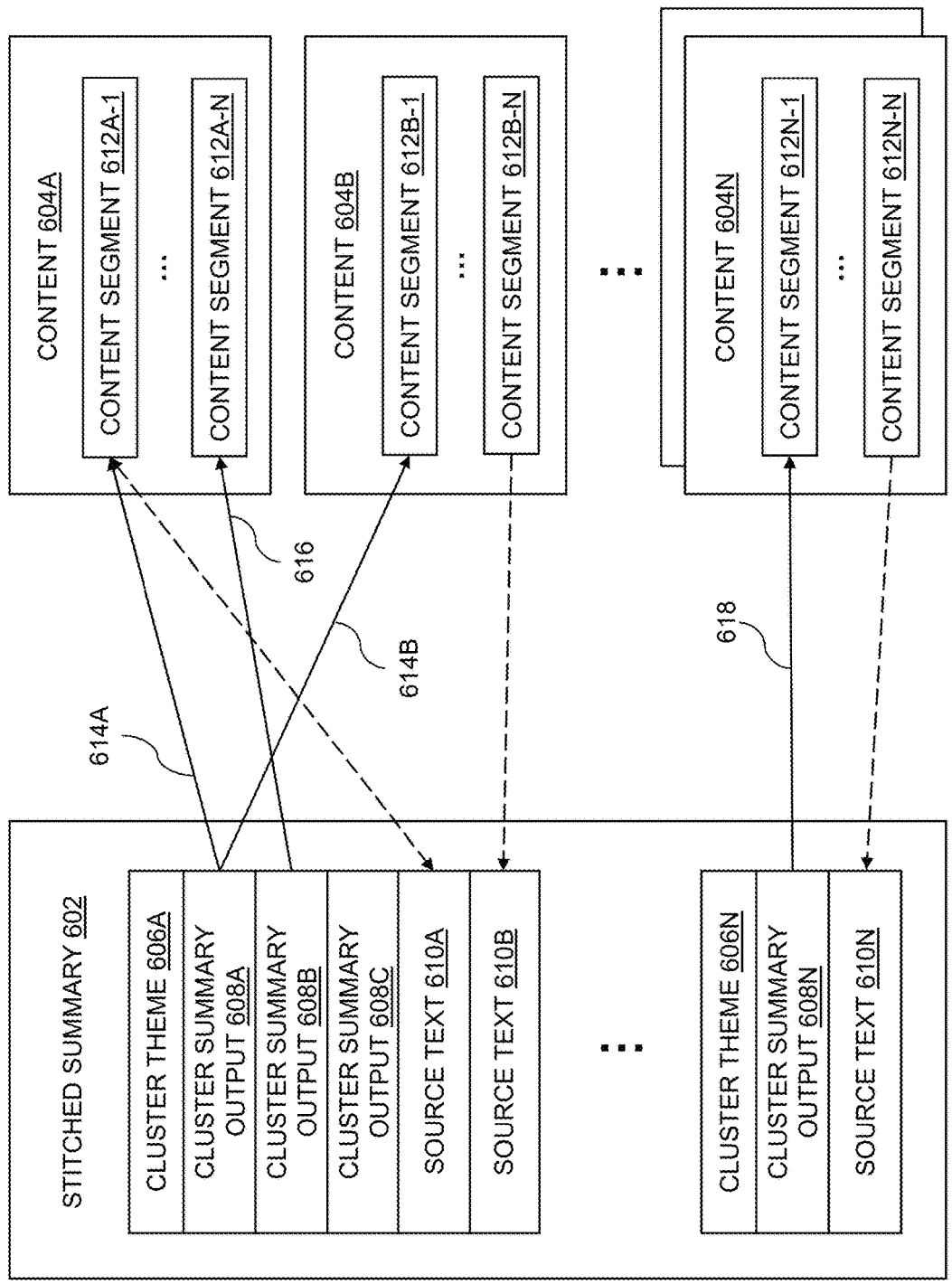
FIG. 6 illustrates another example block diagram of a stitched summary, according to some aspects.

FIG. 6 illustrates another example block diagram of an environment 600 for a stitched summary, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 6, as will be understood by a person of ordinary skill in the art. Environment 600 shall be described with reference to FIGS. 1-4. However, environment 600 is not limited to those example aspects.

In some aspects, environment 600 may include a stitched summary 602 and pieces of content 604A, 604B, and 604N (collectively, content 604). Content 604 may be an example of content 112 or content 132 (of FIG. 1), or content 204 (of FIG. 2). Stitched summary 602 may represent consolidated information for multiple pieces of content (e.g., content 604). In some aspects, stitched summary 602 may be similar to stitched summary 502 (of FIG. 5). In some aspects, stitched summary 602 may also represent another example format or layout for a stitched summary.

As depicted in FIG. 6, stitched summary 602 may include cluster themes 606A and 606N (collectively, cluster themes 606). Cluster themes 606 may be examples of cluster themes 406. Stitched summary 602 may also include cluster summary outputs 608A, 608B, 608C, and 608N (collectively, cluster summary outputs 608). Cluster summary outputs 608 may be examples of cluster summary outputs 408. Stitched summary 602 may also include source texts 610A, 610B, and 610N (collectively, source texts 610). Content 604A may include one or more content segments 612A-1 and 612A-N (collectively, content segments 612A). Content 604B may include one or more content segments 612B-1 and 612B-N (collectively, content segments 612B). Content 604N may include one or more content segments 612N-1 and 612N-N (collectively, content segments 612N).

Similar to the discussion above, stitched summary 602 may be generated by an insight-based research synthesis platform (e.g., insight-based research synthesis platform 102). For example, synthesis engine 122 may obtain stitched summary 602 by stitching one or more cluster summaries with other information relevant to content 604, including source texts, as depicted in FIG. 6 (corresponding insights not shown). Stitched summary 602 may also then be rendered on a client interface (e.g., user interface 136). Similar to the discussion above with respect to FIG. 4, cluster themes 606 and cluster summary outputs 608 may be obtained from a set of insights for a set of content pieces (e.g., content 604). Cluster themes 606 and cluster summary outputs 608 may also capture various shared themes across content 604 and more efficiently provide information relating to those themes in a consolidated and an easily digestible format. In some aspects, cluster summary outputs 608A, 608B, and 608C may all share the same cluster theme 606A. Alternatively or additionally, cluster summary outputs 608A, 608B, and 608C may each have their own corresponding cluster themes (not shown), and cluster theme 606A may represent a composite theme of their individual corresponding themes.

Also similar to the discussion above, source texts 610 may include certain excerpts from content 604. In some aspects, source texts 610 may represent a source of information used in generating a cluster summary output or cluster theme (e.g., by LPS 106). For example, when querying LPS 106 to generate a stitched summary, synthesis engine 122 may include specific instructions inside a prompt to identify relevant source texts. Alternatively or additionally, synthesis engine 122 may leverage semantic search engine 116 to identify similar texts or matching keyword(s) with a generated cluster summary output or cluster theme.

Environment 600 may include source texts 610 alongside cluster themes 606 or cluster summary outputs 608 within stitched summary 602. For example, synthesis engine 122 may include source text 610A from content segment 612A-1, and indicate relevance to cluster theme 606A, cluster summary output 608A, cluster summary output 608B, or cluster summary output 608C. Synthesis engine 122 may also include source text 610B from content segment 612B-N, and indicate relevance to cluster theme 606A, cluster summary output 608A, cluster summary output 608B, or cluster summary output 608C. Synthesis engine 122 may also include source text 610N from content segment 612N-N, and indicate relevance to cluster theme 606N or cluster summary output 608N.

In some aspects, a cluster summary may have been generated using insights from multiple pieces of content. For example, clustering engine 118 may obtain a cluster containing insights from pieces of content 604A and 604B. These insights may correspond with content segment 612A-1 and content segment 612B-1. Synthesis engine 122 may then generate cluster summary output 608A using the information contained within the insights corresponding to content segments 612A-1 and 612B-1. In 614A and 614B, synthesis engine 122 may then include or embed corresponding hyperlinks to the locations of content segments 612A-1 and 612B-1. This may denote that both content segments 612A-1 and 612B-1 are relevant to cluster summary output 608A. In this example, only content segment 612A-N may be relevant to cluster summary output 608B. Similarly, only content segment 612N-1 may be relevant to cluster summary output 608N. In 616, synthesis engine 122 may include or embed a hyperlink to the location of content segment 612A-N within content 604B to denote that content segment 612A-N is relevant to cluster summary output 608B. In 618, synthesis engine 122 may include or embed a hyperlink to the location of content segment 612N-1 within content 604N to denote that content segment 612N-1 is relevant to cluster summary output 608N.

In generating stitched summary 602, synthesis engine 122 may instruct LPS 106 to process and present cluster themes 606, cluster summary outputs 608, source texts 610, hyperlinks, and any other relevant inputs in such a manner to maximize usability, digestibility, information relevance, and information richness of the stitched summary 602. This may include but is not limited to ordering, ranking, consolidation, visualization, tabulation, generating graphics, etc.

The aspects described herein may provide additional technical improvements by maintaining the integrity and traceability of the information generated by LPS 106 and directly referencing the original sources from which the information was derived. For example, this may help directly address any potential hallucinations caused by LPS 106. Stitched summary 502 (of FIG. 5) or stitched summary 602 may then provide fully sourced summaries, presented in a clear and accessible formats that facilitate efficient realization and verification of the provided information (e.g., through subsequent processing).

As with the examples described above, specific stitched summary examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 7:
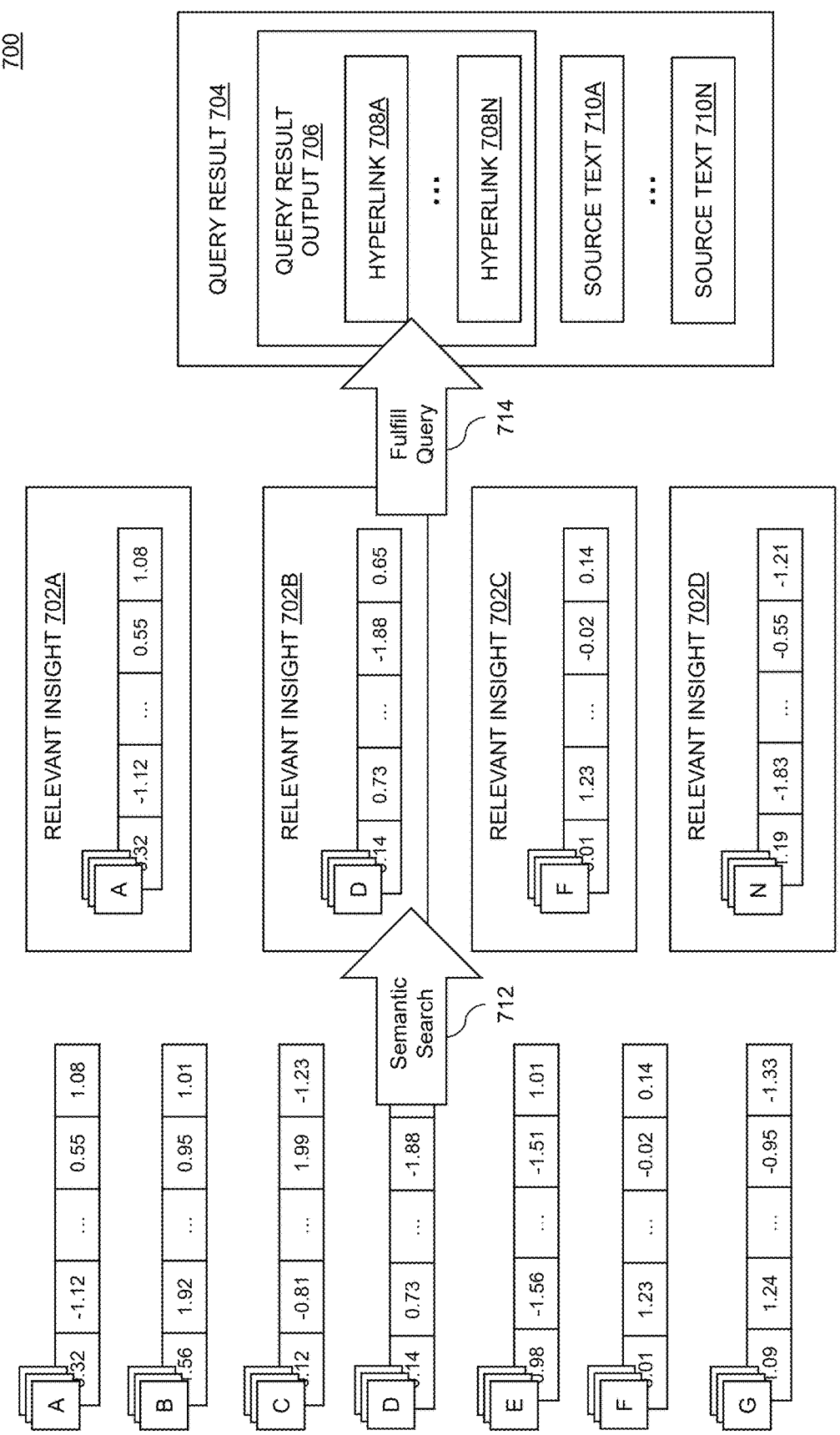
FIG. 7 illustrates an example block diagram for fulfilling a query, according to some aspects.

FIG. 7 illustrates an example block diagram of an environment 700 for fulfilling a query, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 7, as will be understood by a person of ordinary skill in the art. Environment 700 shall be described with reference to FIGS. 1-3. However, environment 700 is not limited to those example aspects.

In some aspects, environment 700 may receive a query to fulfill a sourced query result. For example, insight-based research synthesis platform 102 may receive a client or system query (e.g., user query 142 from client device 104) to retrieve or process information relating to content 132 stored in data store 126. For example, user query 142 may request an analysis of a specific market's landscape discussed across various pieces of content within content 132.

In 712, environment 700 may first retrieve a set of relevant insights. For example, insight-based research synthesis platform 102 may leverage semantic search engine 116 to perform one or more search and retrieval methods on insights "A"-"N" (e.g., using any of the various techniques disclosed above). Insights "A"-"N" may be examples of insights 128 and insights 208(A)-(N). Semantic search engine 116 may obtain relevant insights 702A, 702B, 702C, and 702D (collectively, relevant insights 702) based on a user query (e.g., user query 142). For example, relevant insight 702A may include insight "A," relevant insight 702B may include insight "D," relevant insight 702C may include insight "F," and relevant insight 702D may include insight "N." In some aspects, semantic search engine 116 may have determined these insights as relevant insights 702 based on vector similarity comparisons between insights "A"-"N" and a vector representation of the user query generated by vectorization engine 114. For example, insights "A," "D," "F," and "N" may have the highest similarity values or similarity values above a predetermined similarity threshold compared to the vector representation of the user query. Alternatively or additionally, this may include performing comparisons between the metadata associated with insights "A"-"N" and the user query.

In 714, environment 700 may fulfill the user query. For example, insight-based research synthesis platform 102 may leverage synthesis engine 122 to generate query result 704 based on the user query and the information contained within relevant insights 702 and their associated content segments. Query result 704 may include a query result output 706 and source texts 710A and 710N (collectively, source texts 710). Query result output 706 may include hyperlinks 708A and 708N (collectively, hyperlinks 708). Synthesis engine 122 may first formulate a prompt to obtain query result output 706 using the insight texts and/or metadata corresponding to relevant insights 702 and/or their associated content segments. Synthesis engine 122 may then employ LPS interface 124 to query LPS 106 using the constructed prompt to obtain query result output 706. Synthesis engine 122 may then determine one or more relevant source texts 710 in generating query result 706 (e.g., using any of the techniques described herein). Synthesis engine 122 may then generate query result 704 using query result output 706 and any relevant source texts 710. In some aspects, synthesis engine 122 may also include or embed any relevant hyperlinks (e.g., hyperlinks 708) into query result output 706.

As with the examples described above specific query fulfillment examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 8:
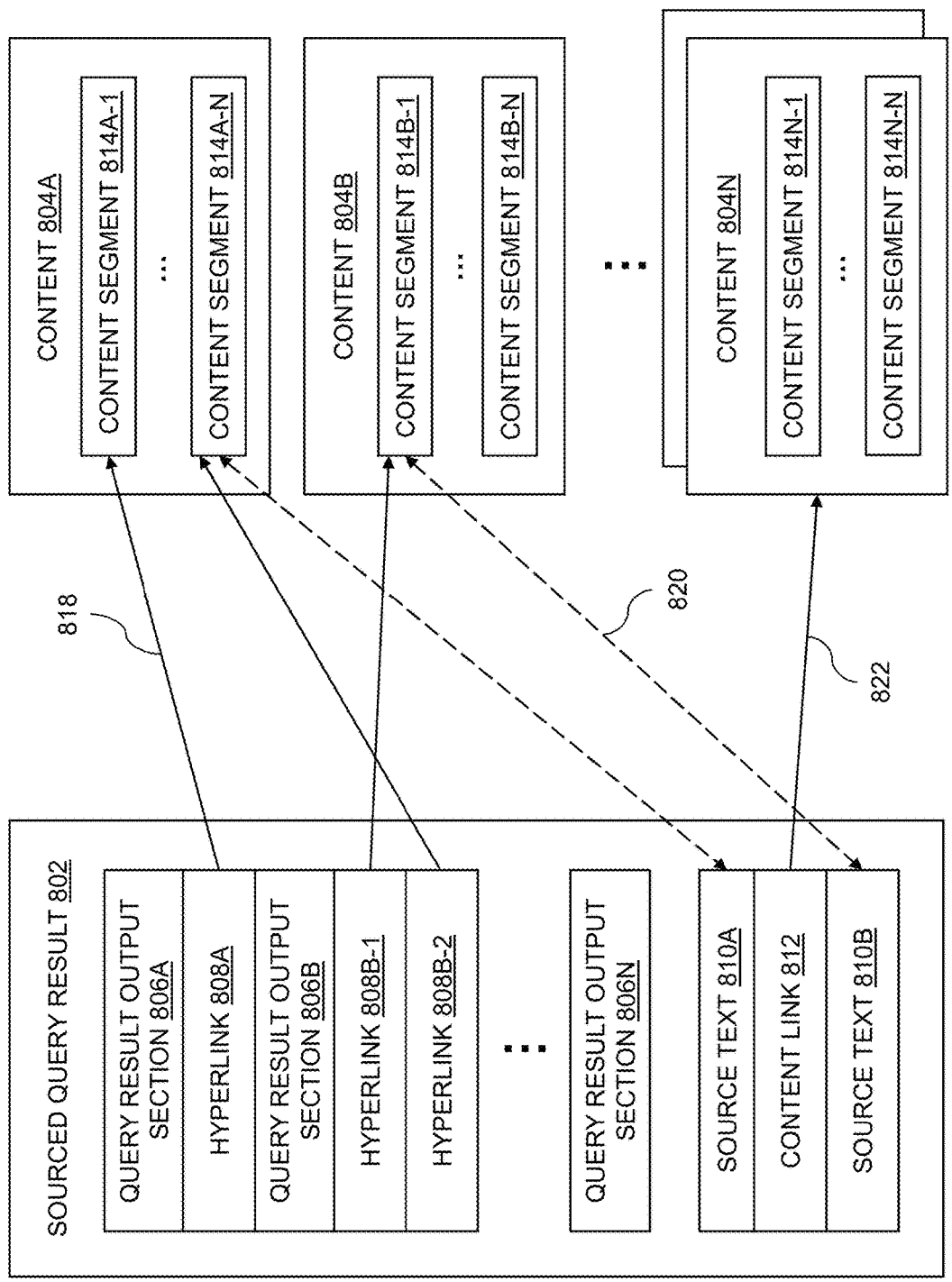
FIG. 8 illustrates an example block diagram of a query result, according to some aspects.

FIG. 8 illustrates an example block diagram of an environment 800 for a sourced query result, according to some aspects. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 8, as will be understood by a person of ordinary skill in the art. Environment 800 shall be described with reference to FIGS. 1-3 and 7. However, environment 800 is not limited to those example aspects.

In some aspects, environment 800 may include a sourced query result 802 and pieces of content 804A, 804B, and 804N (collectively, content 804). Content 804 may be an example of content 112, content 132, or content 204. Sourced query result 802 may represent an accurate and consolidated response to a query citing to one or more pieces of content (e.g., content 804).

As depicted in FIG. 8, sourced query result 802 may include query result output sections 806A, 806B, and 806N (collectively, query result output sections 806). Query result output sections 806 may be examples or sections of query result output 706 (of FIG. 7). Sourced query result 802 may also include hyperlinks 808A, 808B-1, and 808B-2 (collectively, hyperlinks 808). Hyperlinks 808 may be examples of hyperlinks 224 and hyperlinks 708. Sourced query result 802 may also include source texts 810A and 810N (collectively, source texts 810). Content 804A may include one or more content segments 814A-1 and 814A-N (collectively, content segments 814A). Content 804B may include one or more content segments 814B-1 and 814B-N (collectively, content segments 814B). Content 804N may include one or more content segments 814N-1 and 814N-N (collectively, content segments 814N).

Similar to the discussion above, sourced query result 802 may be generated by an insight-based research synthesis platform (e.g., insight-based research synthesis platform 102). For example, synthesis engine 122 may decompose a user query into multiple queries representing composite logical steps required to fulfil the user query ("composite queries"). Synthesis engine 122 may then obtain sourced query result 802 by stitching various sections of one or more query result outputs from various composite queries (e.g., query result output 706), with each query result output leveraging the insight texts and metadata contained within the insights relevant to the associated composite query, as depicted in FIG. 8 (corresponding insights not shown). Sourced query result 802 may also then be rendered on a client interface (e.g., user interface 136). Similar to the discussion above with respect to FIG. 7, query result output sections 806 may be obtained from a set of insights corresponding to multiple pieces of content (e.g., content 804) that are relevant to a user query (e.g., relevant insights 702). In some aspects, query result output sections 806 may all originate from the same query result output section (e.g., query result output section 706). Alternatively or additionally, query result output sections 806 may each be a result from separate queries to LPS 106.

Also similar to the discussion above, source texts 810 may include certain excerpts from content segments within content 804. In some aspects, source texts 810 may represent a source of information used in generating a query result output or query result output sections (e.g., by LPS 106). For example, when querying LPS 106, synthesis engine 122 may include specific instructions specific instructions inside a prompt to identify relevant source texts to the user query. Alternatively or additionally, synthesis engine 122 may leverage semantic search engine 116 to identify similar texts or matching keyword(s) with a generated query result output or query result output sections.

Environment 800 may also include source texts 810 within sourced query result 802. For example, synthesis engine 122 may include source text 810A from content segment 814A-1, indicating relevance to query result output sections 806. Synthesis engine 122 may also include source text 810B from content segment 814B-1, indicating relevance to query result output sections 806. In some aspects, synthesis engine 122 may include or embed hyperlinks or content links within sourced query result 802 to augment sourced query result 802. In 818, synthesis engine 122 may include or embed hyperlink 808A to the location of content segment 814A-1. This may denote that content segment 814A-1 is relevant to query result output section 806A. In 820, synthesis engine 122 may include or embed a hyperlink to the location of content segment 814B-1 within source text 810B to facilitate efficient access of relevant content segments and maintain data integrity. In 822, synthesis engine 122 may include or embed content link 812 to denote that an entire piece of content (e.g., content 804N) is relevant to query result output sections 806.

In generating sourced query result 802, synthesis engine 122 may instruct LPS 106 to process and present query result output sections 806, source texts 810, hyperlinks 808, content links 812, and any other relevant inputs in such a manner to maximize usability, digestibility, information relevance, and information richness of the sourced query result 802. This may include but is not limited to ordering, ranking, consolidation, visualization, tabulation, generating graphics, etc.

Similar to the discussion above, the aspects described herein may provide technical improvements by maintaining the integrity and traceability of the information generated by LPS 106 and directly referencing the original sources from which the information was derived. For example, this may help directly address any potential hallucinations caused by LPS 106. Sourced query result 802 may then provide fully sourced query responses, presented in a clear and accessible formats that facilitate efficient realization and verification of the provided information (e.g., through subsequent processing).

As with the examples described above, specific sourced query result examples have been described herein. However, these examples are not meant to be limiting nor meant to represent an exhaustive list of possible implementations. The scope of the technology disclosed herein is not limited to only these examples, and other implementations are contemplated as appreciated by one skilled in the art.

Figure 9:
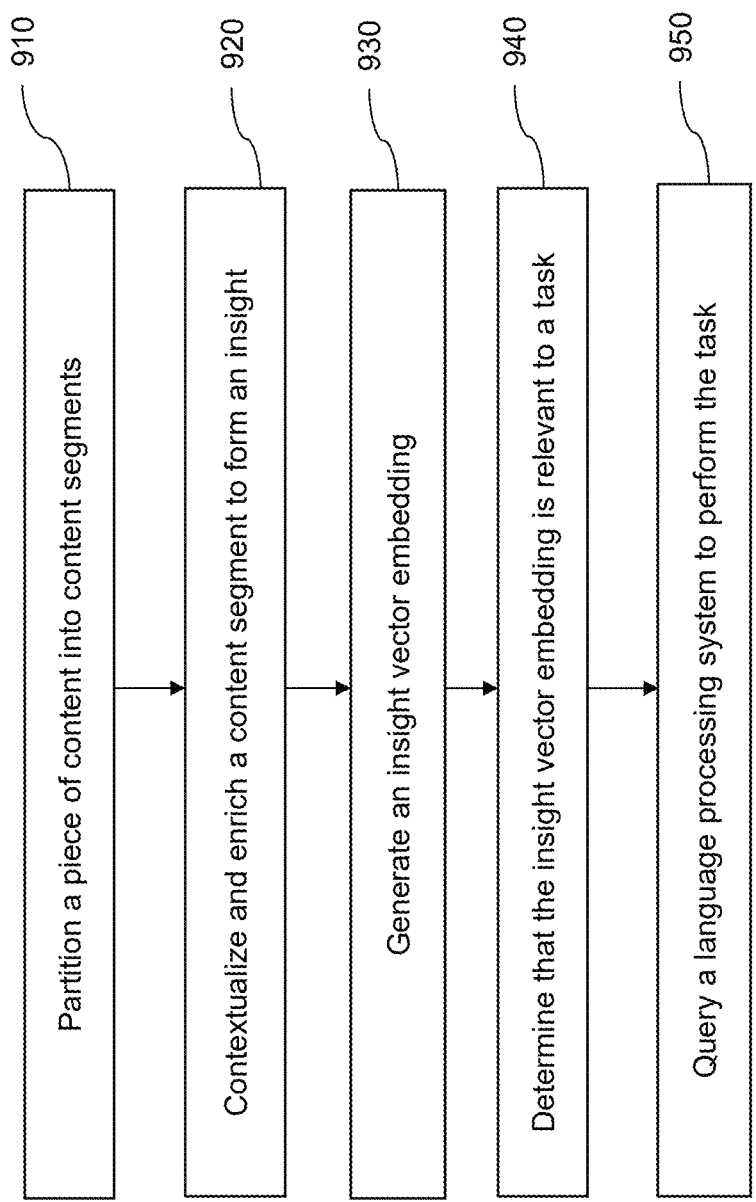
FIG. 9 illustrates an example flow diagram for performing a content-processing task, according to some aspects.

FIG. 9 illustrates an example flow diagram of a method 900 for performing a content-processing task that can be carried out in line with the discussion above, according to some aspects. Method 900 can be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Further, method 900 may not include all the steps illustrated.

Method 900 shall be described with reference to FIGS. 1-8. However, method 900 is not limited to those example aspects. One or more of the operations in the method depicted by FIG. 9 may be carried out by one or more entities, including, without limitation, insight-based research synthesis platform 102, client device 104, LPS 106, other server or cloud-based server processing systems and/or one or more entities operating on behalf of or in cooperation with these or other entities. One or more of the operations in the method depicted by FIG. 9 may also or instead be carried out by one or more servers of an enterprise network and/or a cloud computing network and accessed via a client computer system that is connected thereto. Any such entity may embody a computing system, such as a programmed processing unit or the like, configured to carry out one or more of the method operations. Further, a non-transitory data storage (e.g., disc storage, flash storage, or other computer readable medium) may have stored thereon instructions executable by a processing unit to carry out the various depicted operations.

In 910, a piece of content is partitioned into content segments. For example, insight-based research synthesis platform 102 may partition a piece of content (e.g., from content 112) into a corresponding set of content segments. Insight generation engine 120 may first construct a natural language prompt using prompt templates 134. Insight generation engine 120 may then employ LPS interface 124 to query LPS 106 using the constructed natural language query to obtain content segments for the piece of content. In some aspects, insight generation engine 120 may receive segment boundaries for the piece of content from LPS 106. In such aspects, insight generation engine 120 may then determine the content segments using the segment boundaries. In some aspects, insight generation engine 120 may receive the content segments from LPS 106. In any case, the content segments may, in aggregate, constitute or "sum up to" the corresponding piece of content.

In some aspects, the piece of content being partitioned may first be identified by insight-based research synthesis platform 102. As one non-limiting example, insight-based research synthesis platform 102 may first identify a text file, a numerical file, a picture, a video, an audio file, a document, or the like to be partitioned. As another non-limiting example, insight-based research synthesis platform 102 may identify specific sections or subsections of a numerical file, a picture, a video, an audio file, a document, or the like to be partitioned, such as specific sections that include relevant and/or useful information for performing tasks. In such an example, insight-based research synthesis platform 102 may first remove unnecessary or redundant information from a numerical file, a picture, a video, an audio file, a document, or the like to obtain the piece of content to partition.

In 920, a content segment is contextualized and/or enriched to form an insight. For example, insight-based research synthesis platform 102 may contextualize and/or enrich a content segment (e.g., a content segment obtained in 910) to form an insight. An insight may refer to a self-contained and semantically coherent representation of a content segment. The information contained within an insight may be of higher density than the information contained within its associated content segment. The information contained within an insight may partially be encapsulated in an insight text, generated from the associated content segment and other content. The information contained within an insight may additionally be enriched and partially encapsulated in structured metadata extracted from content, content segments, or additional information sources accessed by the insight-based research synthesis platform 102 (e.g., additional information sources 111). Insight generation engine 120 may first formulate a natural language query to generate an insight text for the content segment. In some aspects, insight generation engine 120 may wrap the content segment along with additional context (e.g., other content segments obtained in 910, the entire piece of content, related content, or information from additional information sources (e.g., additional information sources 111), etc.) in a prompt template. Insight generation engine 120 may also specify a granularity for the insight text based on a task related to the piece of content (e.g., synthesis, summarization, information retrieval, information visualization, text classification, text translation, information analysis, information tabulation, graphing, quote selection, comparisons, etc.). Insight generation engine 120 may then employ LPS interface 124 to query LPS 106 using the constructed natural language query to generate the insight text for the content segment. In some aspects, the constructed natural language query in 920 may be the same natural language query as in 910. Alternatively or additionally, the constructed natural language query in 920 may be a different query as in 910. In some aspects, the insight text may be in a question and answer pairing format. Insight generation engine 120 may repeat a similar process to generate insight texts for any remaining content segments (e.g., the content segments obtained in 910).

In 930, an insight vector embedding is generated. For example, insight-based research synthesis platform may generate an insight vector embedding (e.g., vector embedding 212) for an insight text. In some aspects, vectorization engine 114 may leverage techniques including word2vec, GloVe, or transformer-based models to generate dense vector representations for words or phrases in the insight text. In doing so, vectorization engine 114 may capture semantic relationships and contextual information within the insight text into a format that can be searched and processed by insight-based research synthesis platform 102. Vectorization engine 114 may repeat a similar process to generate insight vector embeddings for any remaining insights obtained for the piece of content.

In 940, an insight vector embedding is determined as being relevant to a task. For example, insight-based research synthesis platform 102 may determine that the insight vector embedding is relevant to a task associated with the piece of content (e.g., synthesis, summarization, information retrieval, information visualization, text classification, text translation, information analysis, information tabulation, graphing, quote selection, comparisons, etc.). In some aspects, insight-based research synthesis platform 102 may receive the task for the content from a client device (e.g., client device 104) via a user query (e.g. user query 142). In some aspects, semantic search engine 116 and/or vectorization engine 114 first generate a vector embedding of user query 142. Semantic search engine 116 may then perform similarity searches (e.g., k-nearest neighbors, approximate nearest neighbors, locality-sensitive hashing, etc.) between the insight embeddings for the piece of content and the vector embedding of user query 142. In this process, semantic search engine 116 may identify one or more insights that are similar and/or relevant the task specified in user query 142.

In 950, a language processing system is queried to perform the task. For example, insight-based research synthesis platform 102 may employ LPS interface 124 to query LPS 106 to perform a task specified by user query 142 using an insight identified as being relevant to the task. In some aspects, user query 142 may identify one or more clusters for a piece of content (or multiple pieces of content) as the task and request one or more corresponding cluster summaries to be generated. Clusters for a piece of content may be obtained by clustering engine 118. For example, clustering engine 118 may perform clustering on the set of insights corresponding to one piece of content (or multiple pieces of content). Synthesis engine 122 may then formulate prompts 130 to generate a cluster summary and/or cluster theme using the identified clusters based on user query 142. In some aspects, synthesis engine 122 may wrap the information contained within the insights of the identified clusters (e.g., corresponding insight texts, content segments, metadata, etc.), inside a prompt template (e.g., prompt templates 134). Synthesis engine 122 may then employ LPS interface 124 to query LPS 106 using the constructed prompt to generate cluster summaries and/or cluster themes for the identified clusters using the information contained within the insights. Synthesis engine 122 may then stitch the cluster summaries and/or cluster themes together to obtain a stitched summary. In generating a stitched summary, synthesis engine 122 may also augment the stitched summary by embedding relevant source texts from content or hyperlinks to relevant content segments. In some aspects, a relevant source text may be an excerpt of a content segment that contains the information that was used in generating a cluster summary or section thereof. For example, a relevant source text may be a sentence from the content segment. In generating outputs (e.g., outputs 135), synthesis engine 122 may instruct LPS 106 to process and present contributing information in such a manner to maximize usability, digestibility, information relevance, and information richness of the output.

In some aspects, user query 142 may specify an information retrieval task for a piece of content, multiple specific pieces of content, or all content on insight-based research synthesis platform 102 (e.g., content 132). In such aspects, synthesis engine 122 may generate a sourced query result for user query 142. Synthesis engine 122 may then leverage semantic search engine 116 to identify one or more relevant insights from a provided piece of content, a provided/specified group of content pieces, or content 132 based on user query 142. Synthesis engine 122 may then formulate prompts 130 to obtain an initial query result for user query 142. In some aspects, synthesis engine 122 may wrap the one or more identified relevant insights inside a prompt template (e.g., prompt templates 134). Synthesis engine 122 may then employ LPS interface 124 to query LPS 106 using the constructed prompt to obtain the initial query result. In some aspects, synthesis engine 122 may then generate a sourced query result using the initial query result obtained from LPS 106 and relevant source text from content segments or hyperlinks to relevant content segments. In some aspects, insight-based research synthesis platform 102 may augment the sourced query result by embedding a hyperlink to an entire relevant piece of content in the sourced query result output.

Figure 10:
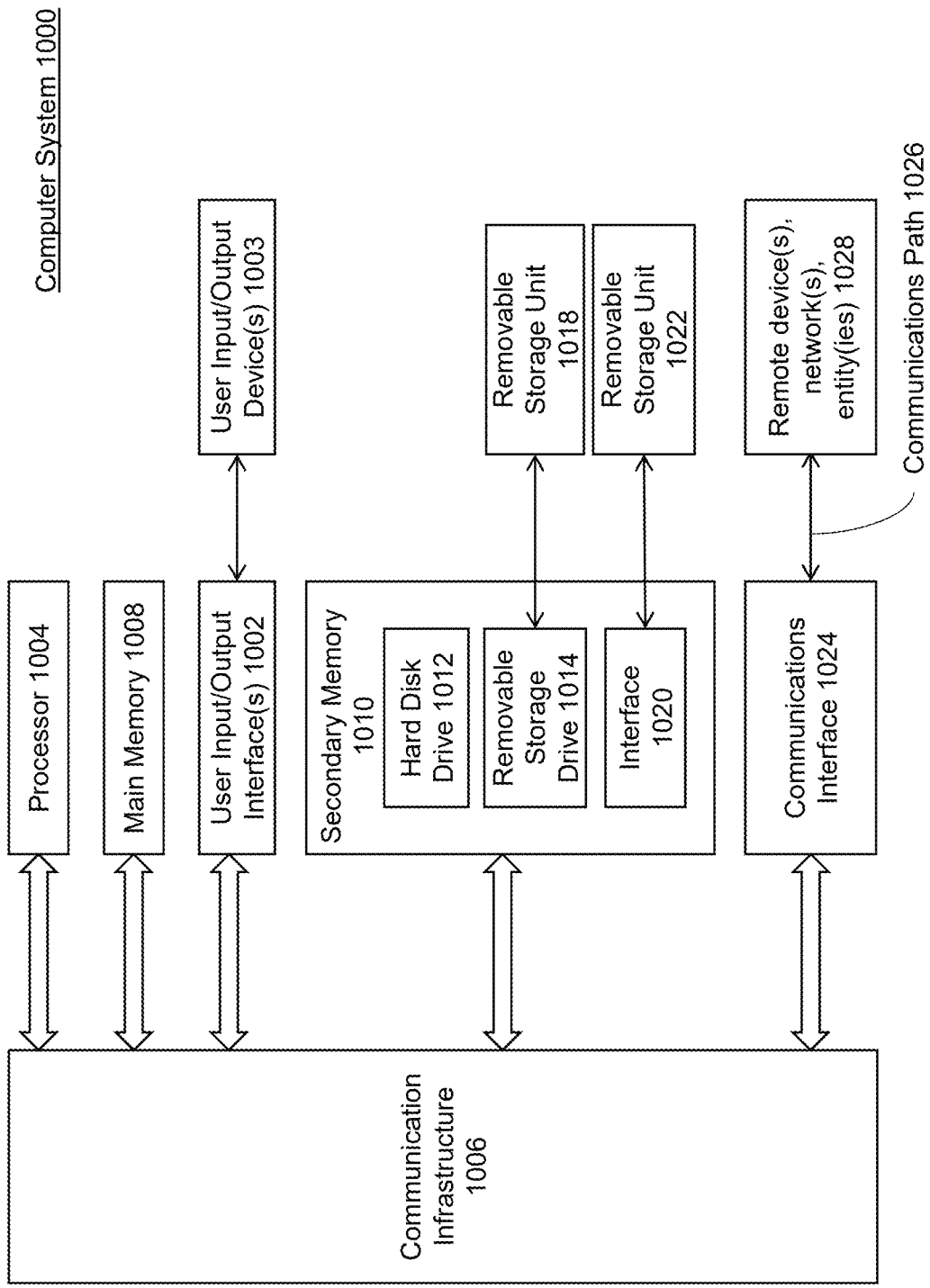
FIG. 10 illustrates an example computer system useful for implementing various aspects.

FIG. 10 depicts an example computer system useful for implementing various aspects described herein.

Various aspects may be implemented, for example, using one or more well-known computer systems, such as computer system 1000 shown in FIG. 10. One or more computer systems 1000 may be used, for example, to implement any of the aspects discussed herein, as well as combinations and sub-combinations thereof. For example, the example computer system may be implemented as part of insight-based research synthesis platform 102, client device 104, LPS 106, content curation platform 108, etc. Cloud implementations may include one or more of the example computer systems operating locally or distributed across one or more server sites.

Computer system 1000 may include one or more processors (also called central processing units, or CPUs), such as a processor 1004. Processor 1004 may be connected to a communication infrastructure or bus 1006.

Computer system 1000 may also include customer input/output device(s) 1002, such as monitors, keyboards, pointing devices, etc., which may communicate with communication infrastructure 1006 through customer input/output interface(s) 1002.

One or more of processors 1004 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1016. Removable storage unit 1016 may include a computer usable or readable storage device having stored thereon computer software (control logic) and/or data. Removable storage unit 1016 may be a floppy disk, magnetic tape, compact disk, DVD, optical storage disk, and/any other computer data storage device. Removable storage drive 1014 may read from and/or write to removable storage unit 1016.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML Customer Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1016 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 10. In particular, aspects can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

Aspects of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The breadth and scope of the present disclosure should not be limited by any of the above-described exemplary aspects, but should be defined only in accordance with the following claims and their equivalents.

What is claimed is:

1. A computer-implemented method comprising:
partitioning, by one or more computing devices, a piece of content into a plurality of content segments;
contextualizing a content segment from the content segments to form an insight comprising an insight text, wherein the insight text comprises a self-contained and semantically coherent representation of the content segment;
generating a vector embedding for the insight text;
determining that the vector embedding is relevant to a task associated with the piece of content; and
querying, based on the determining, a language processing system having one or more language models to perform the task using the insight.

2. The computer-implemented method of claim 1, wherein the insight text has a higher density of information than the piece of content.

3. The computer-implemented method of claim 1, further comprising:
assigning an identifier to the content segment, wherein the identifier links the content segment to the insight.

4. The computer-implemented method of claim 1, further comprising:
obtaining a result for the task from the querying; and
causing the result for the task to be displayed at a user interface.

5. The computer-implemented method of claim 1, wherein the partitioning comprises:
sending, to the language processing system, a first natural language query for obtaining the plurality of content segments; and
receiving, from the language processing system, the plurality of content segments, wherein the plurality of content segments, in aggregate, constitute the piece of content.

6. The computer-implemented method of claim 1, wherein the contextualizing comprises:
constructing a second natural language query for obtaining the insight text from the content segment, wherein the second natural language query comprises information from an additional content segment that is different from the content segment;
sending, to the language processing system, the second natural language query; and
receiving, from the language processing system, the insight text.

7. The computer-implemented method of claim 6, wherein the second natural language query specifies a granularity for the insight text based on the task.

8. The computer-implemented method of claim 1, wherein the task comprises generating a cluster summary associated with the piece of content.

9. The computer-implemented method of claim 1, wherein the determining comprises:
identifying a cluster comprising one or more insights associated with the piece of content, wherein the one or more insights includes the insight.

10. The computer-implemented method of claim 9, wherein the querying comprises:
sending, to the language processing system, a third natural language query for obtaining a cluster summary for the cluster, wherein the third natural language query comprises one or more insight texts corresponding to the one or more insights; and
receiving, from the language processing system, the cluster summary.

11. The computer-implemented method of claim 10, further comprising:
receiving, from the language processing system, a cluster theme for the cluster.

12. The computer-implemented method of claim 10, further comprising:
generating a summary for the piece of content comprising the cluster summary.

13. The computer-implemented method of claim 12, wherein the cluster summary is a first cluster summary, and the generating the summary for the piece of content comprises:
generating a second cluster summary associated with the piece of content; and
stitching the first cluster summary and the second cluster summary together to obtain the summary for the piece of content.

14. The computer-implemented method of claim 12, wherein the generating the summary for the piece of content comprises:
augmenting the summary for the piece of content with a link to the content segment.

15. The computer-implemented method of claim 14, wherein the summary for the piece of content further comprises a relevant excerpt from the content segment.

16. The computer-implemented method of claim 1, wherein the insight text comprises a question and answer pairing.

17. A system, comprising:
one or more processors; and
a memory having instructions stored thereon that, when executed by the one or more processors, cause the one or more processors to perform operations comprising:
partitioning a piece of content into a plurality of content segments;
contextualizing a content segment from the content segments to form an insight comprising an insight text, wherein the insight text comprises a self-contained and semantically coherent representation of the content segment;
generating a vector embedding for the insight text;
determining that the vector embedding is relevant to a task associated with the piece of content; and
querying, based on the determining, a language processing system having one or more language models to perform the task using the insight.

18. The system of claim 17, wherein the insight text has a higher density of information than the piece of content.

19. The system of claim 17, the operations further comprising:
assigning an identifier to the content segment, wherein the identifier links the content segment to the insight.

20. The system of claim 17, the operations further comprising:
obtaining a result for the task from the querying; and
causing the result for the task to be displayed at a user interface.

21. The system of claim 17, wherein the partitioning comprises:
sending, to the language processing system, a first natural language query for obtaining the plurality of content segments; and
receiving, from the language processing system, the plurality of content segments, wherein the plurality of content segments, in aggregate, constitute the piece of content.

22. The system of claim 17, wherein the contextualizing comprises:
constructing a second natural language query for obtaining the insight text from the content segment, wherein the second natural language query comprises information from an additional content segment that is different from the content segment;
sending, to the language processing system, the second natural language query; and
receiving, from the language processing system, the insight text.

23. The system of claim 22, wherein the second natural language query specifies a granularity for the insight text based on the task.

24. The system of claim 17, wherein the task comprises generating a cluster summary associated with the piece of content.

25. The system of claim 17, wherein the determining comprises:
identifying a cluster comprising one or more insights associated with the piece of content, wherein the one or more insights includes the insight.

26. The system of claim 25, wherein the querying comprises:
sending, to the language processing system, a third natural language query for obtaining a cluster summary for the cluster, wherein the third natural language query comprises one or more insight texts corresponding to the one or more insights; and
receiving, from the language processing system, the cluster summary.

27. The system of claim 26, the operations further comprising:
receiving, from the language processing system, a cluster theme for the cluster.

28. The system of claim 26, the operations further comprising:
generating a summary for the piece of content comprising the cluster summary.

29. The system of claim 28, wherein the cluster summary is a first cluster summary, and the generating the summary for the piece of content comprises:
generating a second cluster summary associated with the piece of content; and
stitching the first cluster summary and the second cluster summary together to obtain the summary for the piece of content.

30. The system of claim 28, wherein the generating the summary for the piece of content comprises:
augmenting the summary for the piece of content with a link to the content segment.

31. The system of claim 30, wherein the summary for the piece of content further comprises a relevant excerpt from the content segment.

32. The system of claim 17, wherein the insight text comprises a question and answer pairing.

33. A non-transitory computer-readable storage medium having instructions stored thereon that, when executed by one or more processing devices, cause the one or more processing devices to perform operations comprising:
partitioning a piece of content into a plurality of content segments;
contextualizing a content segment from the content segments to form an insight comprising an insight text, wherein the insight text comprises a self-contained and semantically coherent representation of the content segment;
generating a vector embedding for the insight text;
determining that the vector embedding is relevant to a task associated with the piece of content; and
querying, based on the determining, a language processing system having one or more language models to perform the task using the insight.

34. The non-transitory computer-readable storage medium of claim 33, wherein the insight text has a higher density of information than the piece of content.

35. The non-transitory computer-readable storage medium of claim 33, the operations further comprising:
assigning an identifier to the content segment, wherein the identifier links the content segment to the insight.

36. The non-transitory computer-readable storage medium of claim 33, the operations further comprising:
obtaining a result for the task from the querying; and
causing the result for the task to be displayed at a user interface.

37. The non-transitory computer-readable storage medium of claim 33, wherein the partitioning comprises:
sending, to the language processing system, a first natural language query for obtaining the plurality of content segments; and
receiving, from the language processing system, the plurality of content segments, wherein the plurality of content segments, in aggregate, constitute the piece of content.

38. The non-transitory computer-readable storage medium of claim 33, wherein the contextualizing comprises:
constructing a second natural language query for obtaining the insight text from the content segment, wherein the second natural language query comprises information from an additional content segment that is different from the content segment;
sending, to the language processing system, the second natural language query; and
receiving, from the language processing system, the insight text.

39. The non-transitory computer-readable storage medium of claim 38, wherein the second natural language query specifies a granularity for the insight text based on the task.

40. The non-transitory computer-readable storage medium of claim 33, wherein the task comprises generating a cluster summary associated with the piece of content.

41. The non-transitory computer-readable storage medium of claim 33, wherein the determining comprises:
 identifying a cluster comprising one or more insights associated with the piece of content, wherein the one or more insights includes the insight.

42. The non-transitory computer-readable storage medium of claim 41, wherein the querying comprises:
 sending, to the language processing system, a third natural language query for obtaining a cluster summary for the cluster, wherein the third natural language query comprises one or more insight texts corresponding to the one or more insights; and
 receiving, from the language processing system, the cluster summary.

43. The non-transitory computer-readable storage medium of claim 42, the operations further comprising:
 receiving, from the language processing system, a cluster theme for the cluster.

44. The non-transitory computer-readable storage medium of claim 42, the operations further comprising:
 generating a summary for the piece of content comprising the cluster summary.

45. The non-transitory computer-readable storage medium of claim 44, wherein the cluster summary is a first cluster summary, and the generating the summary for the piece of content comprises:
 generating a second cluster summary associated with the piece of content; and
 stitching the first cluster summary and the second cluster summary together to obtain the summary for the piece of content.

46. The non-transitory computer-readable storage medium of claim 44, wherein the generating the summary for the piece of content comprises:
 augmenting the summary for the piece of content with a link to the content segment.

47. The non-transitory computer-readable storage medium of claim 46, wherein the summary for the piece of content further comprises a relevant excerpt from the content segment.

48. The non-transitory computer-readable storage medium of claim 33, wherein the insight text comprises a question and answer pairing.

\* \* \* \* \*